US012752373B2

(12) United States Patent
Wang et al.

(10) Patent No.: US 12,752,373 B2
(45) Date of Patent: Oct. 6, 2026

(54) LASER PROCESSING DEVICE AND LASER PROCESSING METHOD USING SAME

(71) Applicant: Panasonic Intellectual Property Management Co., Ltd., Osaka (JP)

(72) Inventors: Jingbo Wang, Hyogo (JP); Masatoshi Nishio, Osaka (JP); Kenzo Shibata, Hyogo (JP); Manabu Nishihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 892 days.

(21) Appl. No.: 17/529,911

(22) Filed: Nov. 18, 2021

(65) Prior Publication Data

US 2022/0072655 A1 Mar. 10, 2022

Related U.S. Application Data

(63) Continuation of application No. PCT/JP2020/017620, filed on Apr. 24, 2020.

(30) Foreign Application Priority Data

May 29, 2019 (JP) ................................ 2019-100183

(51) Int. Cl.
*B23K 26/064* (2014.01)
*B23K 26/067* (2006.01)
(Continued)

(52) U.S. Cl.
CPC ...... *B23K 26/0648* (2013.01); *B23K 26/0643* (2013.01); *B23K 26/0673* (2013.01);
(Continued)

(58) Field of Classification Search
CPC ............... B23K 26/0648; B23K 26/21; B23K 26/0643; B23K 26/0884; B23K 26/0673; B23K 26/064
(Continued)

(56) References Cited

U.S. PATENT DOCUMENTS 4,927,226 A 5/1990 Oritz, Jr.
6,515,257 B1 * 2/2003 Jain ..................... B23K 26/382 219/121.73
(Continued)

FOREIGN PATENT DOCUMENTS

JP 59-042502 3/1984
JP 61-016938 Y 5/1986
(Continued)

OTHER PUBLICATIONS

Machine Translation of WO-2017159439-A1 (Year: 2024).*
(Continued)

*Primary Examiner* — John J Norton
*Assistant Examiner* — Thomas J Ward
(74) *Attorney, Agent, or Firm* — Wenderoth, Lind & Ponack, L.L.P.

(57) ABSTRACT

A laser processing device includes a laser oscillator, first to third optical fibers, a beam control mechanism, and first to third laser light emitting heads attached to the first to third optical fibers, respectively. The beam control mechanism includes a condenser lens, first to third optical path changing mechanisms provided on an optical path of laser light LB after being transmitted through the condenser lens, and a controller that controls operations of the first to third optical path changing mechanisms. The beam control mechanism causes the laser light to be emitted from the first laser light emitting head via the selected first optical fiber.

16 Claims, 18 Drawing Sheets

(51) Int. Cl.
*B23K 26/08* (2014.01)
*B23K 26/21* (2014.01)

(52) U.S. Cl.
CPC .......... *B23K 26/0884* (2013.01); *B23K 26/21* (2015.10); *B23K 26/064* (2015.10)

(58) Field of Classification Search
USPC ..................................................... 219/121.63
See application file for complete search history.

(56) References Cited

U.S. PATENT DOCUMENTS

| | | | | |
|---|---|---|---|---|
| 7,460,755 | B2 * | 12/2008 | Bruesselbach ....... | G02B 6/2808 385/115 |
| 7,982,935 | B2 | 7/2011 | Grapov et al. | |
| 8,320,426 | B2 | 11/2012 | Grapov et al. | |
| 8,781,269 | B2 | 7/2014 | Huber et al. | |
| 2003/0000927 | A1 | 1/2003 | Kanaya et al. | |
| 2004/0026381 | A1 | 2/2004 | Tsukamoto et al. | |
| 2006/0237402 | A1 * | 10/2006 | Nagashima ........ | B23K 26/0604 219/121.64 |
| 2014/0021178 | A1 | 1/2014 | Brockmann et al. | |
| 2018/0159299 | A1 * | 6/2018 | Zhou ........................ | G02B 6/04 |
| 2018/0178323 | A1 | 6/2018 | Takahashi et al. | |
| 2019/0030641 | A1 | 1/2019 | Nagayasu et al. | |
| 2019/0262938 | A1 | 8/2019 | Nagayasu et al. | |

FOREIGN PATENT DOCUMENTS

| | | | | |
|---|---|---|---|---|
| JP | 2002-273586 | | 9/2002 | |
| JP | 2003-001464 | | 1/2003 | |
| JP | 2012-170956 | | 9/2012 | |
| JP | 6045508 | B | 12/2016 | |
| JP | 2018-103193 | | 7/2018 | |
| JP | 2018-153815 | | 10/2018 | |
| WO | 2017/051504 | | 3/2017 | |
| WO | 2017/159439 | | 9/2017 | |
| WO | WO-2017159439 | A1 * | 9/2017 | ........... B23K 26/035 |
| WO | 2018/097018 | | 5/2018 | |

OTHER PUBLICATIONS

Extended European Search Report issued Jul. 27, 2022 in European Application No. 20814581.3.
International Search Report of PCT application No. PCT/JP2020/017620 dated Jun. 9, 2020.

* cited by examiner

LASER PROCESSING DEVICE AND LASER PROCESSING METHOD USING SAME

This application is a continuation of the PCT International Application No. PCT/JP2020/017620 filed on Apr. 24, 2020, which claim the benefit of foreign priority of Japanese patent application No. 2019-100183 filed on May 29, 2019, the contents all of which are incorporated herein by reference.

TECHNICAL FIELD

The present invention relates to a laser processing device and a laser processing method using the same.

BACKGROUND ART

In recent years, a laser processing device having a plurality of laser light emitting heads has been proposed. Such a laser processing device includes a plurality of optical fibers connected to one laser oscillator and laser light emitting heads respectively attached to the plurality of optical fibers. The laser processing device appropriately switches between the optical fibers through which the laser light is transmitted, and transmits the laser light to the selected laser light emitting head.

For example, PTL 1 discloses a laser system in which laser light is incident on a plurality of bundled optical fibers that can be optically coupled with laser light. The laser system includes a reflector and a condenser lens disposed on an optical path of the laser light, and a piezo actuator that moves the reflector or the condenser lens. The piezo actuator causes the laser light to be incident on an optical fiber selected from among the plurality of optical fibers by changing an incident position of the laser light in the plurality of bundled optical fibers.

On the other hand, a technology of performing laser processing by changing beam quality of laser light according to a material or a shape of a workpiece has been proposed.

In PTL 1, the optical fiber is a multi-clad fiber. The laser system changes a beam profile of the laser light by adjusting an incident position of the laser light.

PTL 2 proposes a configuration in which an incident position of laser light on an incident end of a multi-clad fiber is changed by moving a position of a condenser lens or inserting a wedge-shaped optical element into an optical path of the laser light.

CITATION LIST

Patent Literature

PTL 1: US 2018/159299 A1
PTL 2: U.S. Pat. No. 8,781,269

SUMMARY OF THE INVENTION

Technical Problem

However, in the configuration disclosed in PTL 1, since the reflector and the condenser lens which are relatively large optical components are moved by the actuator, there is a problem in responsiveness, and it is difficult to quickly cause the laser light to be incident on the optical fiber selected from among the plurality of optical fibers by quickly changing the optical path of the laser light.

As disclosed in PTL 2, in changing the incident position of the laser light by moving the position of the condenser lens, since it is necessary to move the condenser lens on a straight line by the actuator, there is a problem in achieving both positional accuracy and responsiveness.

The present invention has been made in view of such a point, and an object of the present invention is to provide a laser processing device that includes a plurality of laser light emitting heads and is capable of easily and quickly switching between the laser light emitting heads on which laser light is incident, and a laser processing method using the same.

Solution to Problem

In order to achieve the above object, a laser processing device according to the present invention includes at least a laser oscillator that generates laser light, a fiber bundle that is formed by bundling a plurality of optical fibers so as to have a predetermined arrangement relationship, a beam control mechanism that is provided in the laser oscillator, and a plurality of laser light emitting heads that are attached to emission ends of the plurality of optical fibers, respectively, and illuminate laser light to workpieces, respectively. The beam control mechanism includes at least a condenser lens that receives the laser light, and condenses the laser light at a predetermined magnification, a plurality of optical path changing mechanisms that are provided on an optical path of the laser light traveling between the condenser lens and an incident end face of the fiber bundle, and changes the optical path of the laser light, and a controller that controls operations of the plurality of optical path changing mechanisms, and the beam control mechanism causes the laser light to be incident on one optical fiber selected from among the plurality of optical fibers, and causes the laser light to be emitted from the laser light emitting head attached to the one optical fiber.

According to this configuration, it is possible to easily and quickly switch between the laser light emitting heads from which the laser light is emitted. It is possible to reduce a number of man-hours and time required to switch between the laser light emitting heads, and it is possible to reduce the cost of laser processing.

A laser processing method according to the present invention is a laser processing method using the laser processing device. The method includes at least a first illumination step of illuminating the laser light having a first power distribution to the workpiece, and a second illumination step of subsequently illuminating the laser light having a second power distribution different from the first power distribution to the workpiece.

According to this method, it is possible to reliably form a molten pool and a keyhole in a workpiece at an initial stage of the start of welding, and welding quality of the workpiece is improved.

Advantageous Effect of Invention

According to the laser processing device according to the present invention, it is possible to easily and quickly switch between the laser light emitting heads from which the laser light is emitted. According to the laser processing method according to the present invention, the welding quality of the workpiece is improved.

DESCRIPTION OF EMBODIMENTS

Hereinafter, exemplary embodiments of the present invention will be described in detail with reference to the drawings. Descriptions of preferred exemplary embodiments to be described below are intrinsically examples, and are not intended to limit the present invention, and applications or uses of the present invention.

First Exemplary Embodiment

[Configuration of Laser Processing Device]

Figure 1:
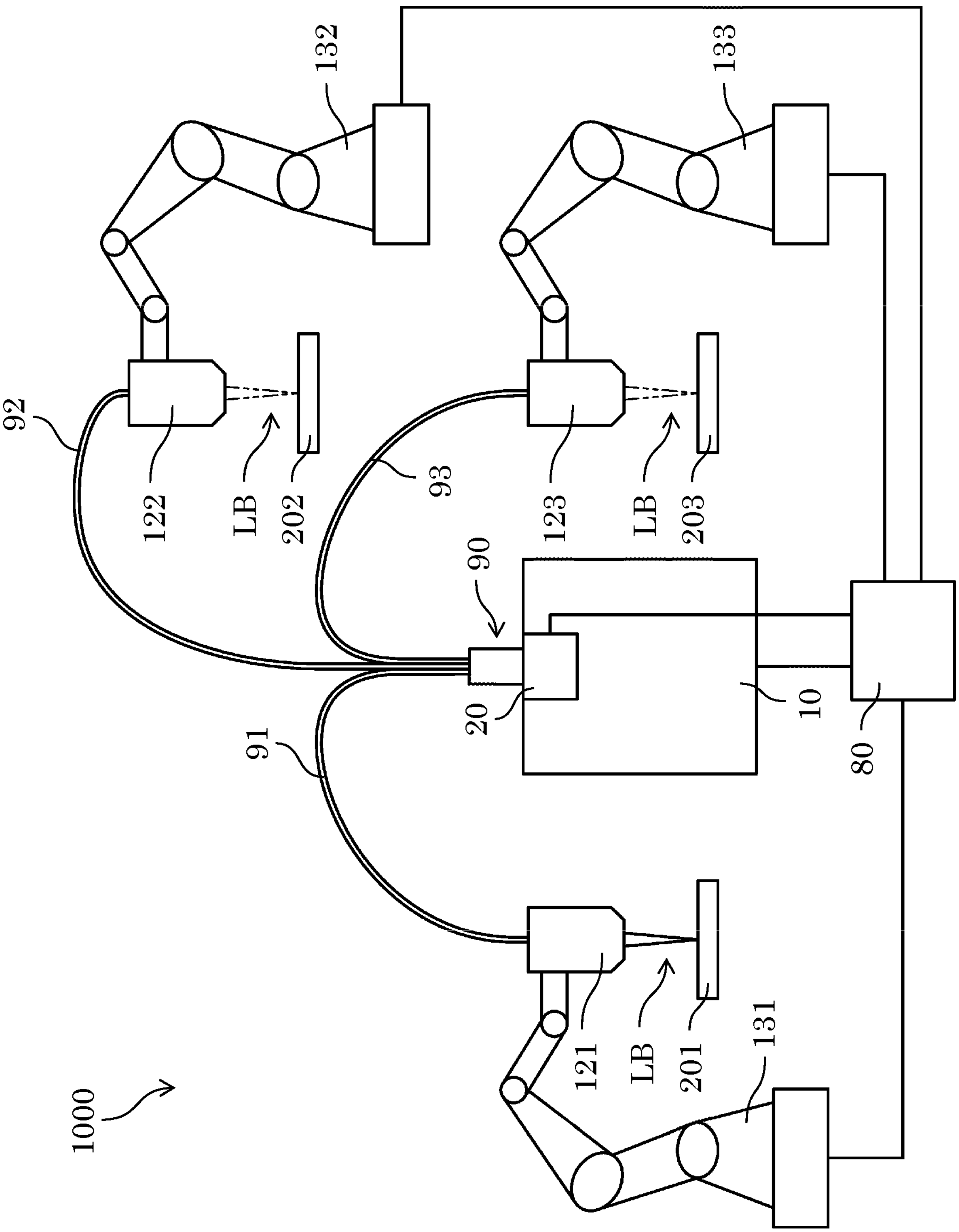
FIG. 1 is a schematic diagram illustrating a configuration of a laser processing device according to a first exemplary embodiment of the present invention.

FIG. 1 is a schematic diagram of a configuration of a laser processing device according to the present exemplary embodiment, and laser processing device 1000 includes laser oscillator 10, beam control mechanism 20, controller 80, fiber bundle 90, first to third laser light emitting heads 121 to 123, and first to third manipulators 131 to 133.

Laser oscillator 10 is a laser light source that receives power supply from a power supply (not illustrated) and generates laser light LB. Laser oscillator 10 may include a single laser light source or may include a plurality of laser modules. In the latter case, laser light rays emitted from the plurality of laser modules are coupled and emitted as laser light LB.

Beam control mechanism 20 is provided in laser oscillator 10, and transmits laser light LB to a selected optical fiber of fiber bundle 90. A configuration and an operation of beam control mechanism 20 will be described later. Beam control mechanism 20 can also control a power distribution of laser light LB emitted from an emission end of the optical fiber, but this control will be described later.

Fiber bundle 90 is an optical component formed by bundling first to third optical fibers 91 to 93. First optical fiber 91 includes core 91*a* and first cladding 91*b* provided coaxially with core 91*a* on an outer peripheral side of core 91*a* (see FIG. 5). Similarly, each of second and third optical fibers 92 and 93 also has the core and the first cladding (both not illustrated). Although not illustrated, a film or a resin-based protective layer that mechanically protects the optical fiber is provided on an outer peripheral surface of first cladding 91*b*. First to third optical fibers 91 to 93 are covered with protective member 110 made of resin or the like in a bundled state, and an arrangement relationship between the optical fibers is fixed (see FIGS. 4A and 4B).

Each of first to third laser light emitting heads 121 to 123 is attached to the emission end of the corresponding optical fiber, and illuminates laser light LB transmitted through the optical fiber to each of workpieces 201 to 203. Workpieces 201 to 203 are laser-processed by laser light LB. Optical components (not illustrated), for example, a collimator lens, a condenser lens, a protective glass, and the like are disposed inside each of first to third laser light emitting heads 121 to 123.

Controller 80 controls laser oscillation of laser oscillator 10. Specifically, the controller controls laser oscillation by supplying control signals for an output current, an on-time, an off-time, and the like to a power supply (not illustrated) connected to laser oscillator 10.

Controller 80 performs drive control of first motor 71 (see FIGS. 3A and 3B) or second motor 72 and third motor 73 (see FIG. 8) provided in beam control mechanism 20 according to contents of a selected laser processing program. Controller 80 controls operations of first to third manipulators 131 to 133. The laser processing program is stored in a storage (not illustrated). The storage may be provided inside controller 80 or may be provided outside controller 80 and may be configured to exchange data with controller 80. Controller 80 constitutes a part of beam control mechanism 20.

Each of first to third manipulators 131 to 133 is connected to controller 80, and moves each of first to third laser light emitting heads 121 to 123 so as to draw a predetermined trajectory according to the above-described laser processing program. A controller that controls the operations of first to third manipulators 131 to 133 may be provided separately.

[Configuration of Beam Control Mechanism]

Figure 2:
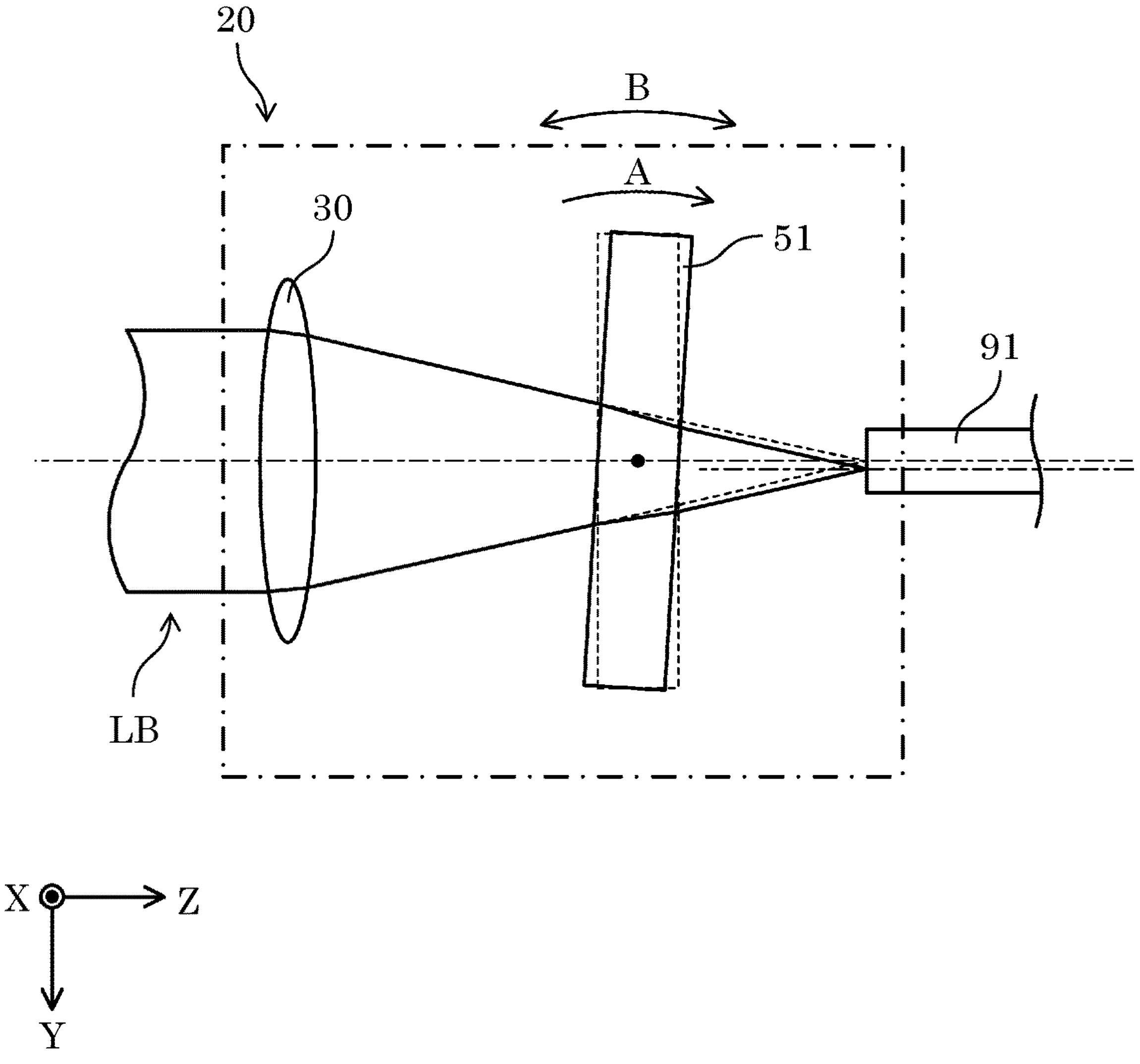
FIG. 2 is a schematic diagram of a beam control mechanism as viewed from an X direction.
Figure 3A:
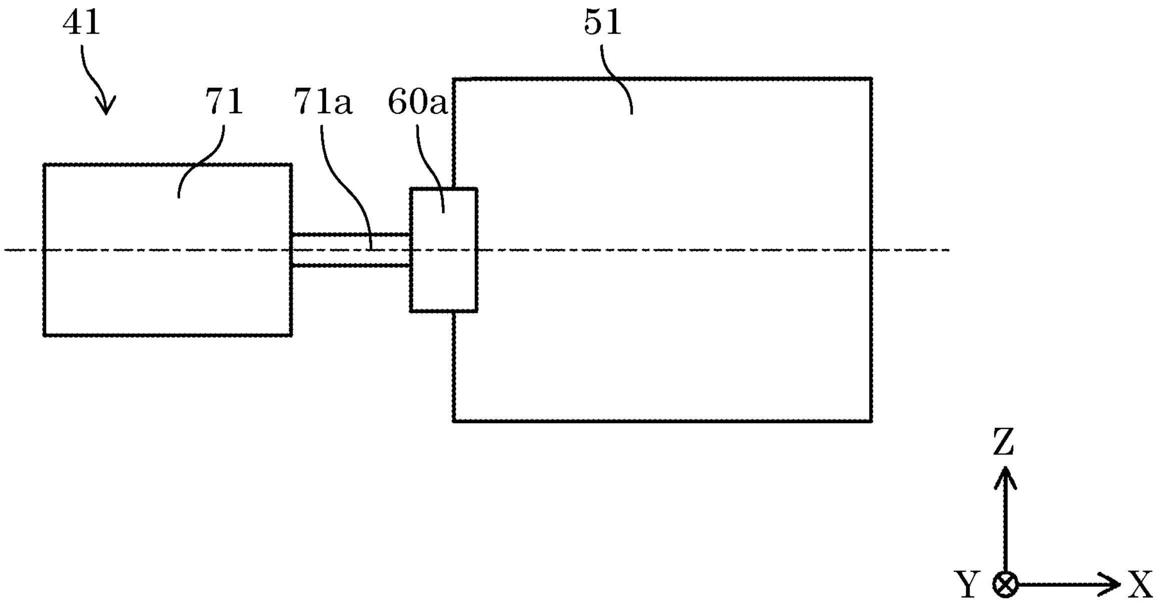
FIG. 3A is a schematic diagram of main parts of the beam control mechanism as viewed from a Y direction.
Figure 3B:
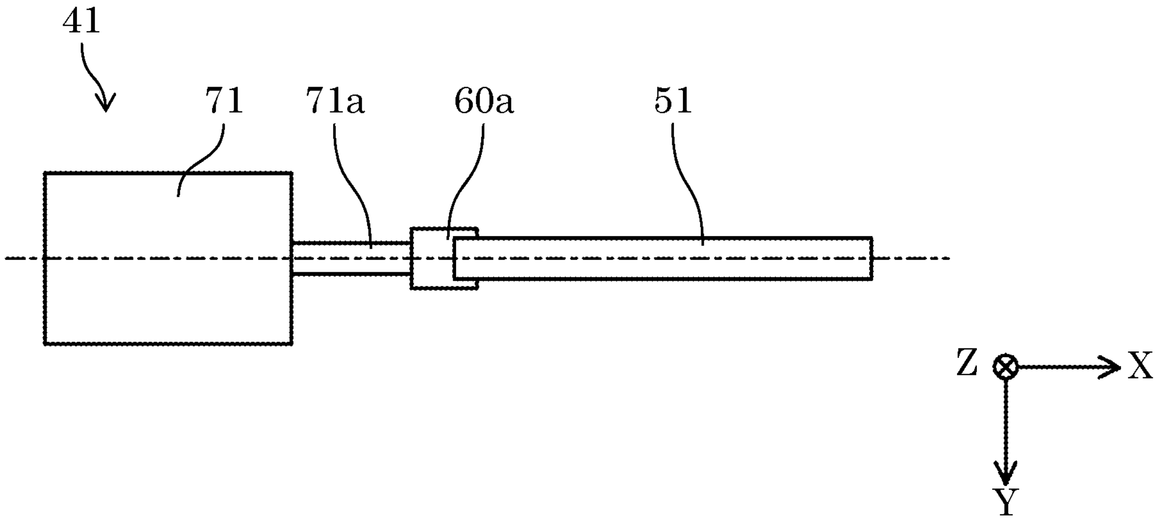
FIG. 3B is a schematic diagram of the main parts of the beam control mechanism as viewed from a Z direction.

FIG. 2 is a schematic diagram of the beam control mechanism as viewed from an X direction, FIG. 3A is a schematic diagram of main parts of the beam control mechanism as viewed from a Y direction, and FIG. 3B is a schematic diagram of the main parts of the beam control mechanism as viewed from a Z direction. For the sake of convenience in description, only first optical fiber 91 of first to third optical fibers 91 to 93 is illustrated in FIG. 2.

In the present specification, in beam control mechanism 20, a traveling direction of laser light LB until the laser light is incident on condenser lens 30 may be referred to as the Z direction, a direction in which output shaft 71*a* of first motor 71 extends may be referred to as the X direction, and a direction substantially orthogonal to the X direction and the Z direction may be referred to as the Y direction. The Z direction is the same as a direction in which an optical axis of laser light LB extends. The X direction is substantially orthogonal to the Z direction. An axis of output shaft 71*a* of first motor 71 may be referred to as an X axis (first axis).

In the present specification, the expression "substantially orthogonal" means being orthogonal, taking into account assembly tolerances of components, and does not mean being strictly orthogonal. Similarly, the expression "substantially the same" or "substantially equal" means being the same or being equal, taking into account manufacturing tolerances and assembly tolerances of components, and does not mean that both targets to be compared are strictly the same or equal. The expression "substantially equal" also means being equal in comparison with an estimated value, but does not mean that a target to be compared and the estimated value are strictly equal.

As illustrated in FIGS. 2, 3A, and 3B, beam control mechanism 20 includes condenser lens 30, first optical member 51, and first motor 71. As described above, beam control mechanism 20 includes controller 80. As described later, first motor 71 and first optical member 51 function as first optical path changing mechanism 41 that changes an optical path of laser light LB after being condensed by condenser lens 30.

Laser light LB is incident on condenser lens 30 in a state of being collimated light by an optical component (not illustrated), for example, a collimating lens or the like. Condenser lens 30 condenses laser light LB at a predetermined magnification and causes the laser light to be directed to fiber bundle 90.

First optical member 51 is a parallel plate-shaped member made of a material transparent to laser light LB. First optical member 51 is made of, for example, quartz and has a refractive index larger than 1 with respect to a wavelength of laser light LB. As first optical member 51, a member in which antireflection coating is performed on both surfaces may be used in order to reduce a reflectance to the incident laser light as much as possible. It is preferable that a reflectance when the antireflection coating is performed is much less than 1%. First optical member 51 is provided on the optical path of laser light LB traveling between condenser lens 30 and fiber bundle 90. First optical member 51 is movable between a predetermined position (first position) on the optical path of laser light LB traveling between condenser lens 30 and an incident end face of fiber bundle 90 and the outside of the optical path. Specifically, when first optical member 51 is disposed on the optical path of laser light LB traveling between condenser lens 30 and the incident end face of fiber bundle 90, first optical member 51 is disposed at the first position as viewed in a direction orthogonal to the optical axis of laser light LB, for example, the X direction or the Y direction. Laser light LB after being condensed by condenser lens 30 is incident on first optical member 51 disposed at the first position. On the other hand, when first optical member 51 is moved to the outside of the optical path, laser light LB is disposed so as not to be incident on any portion of first optical member 51.

First motor 71 has output shaft 71*a*, and is coupled to first optical member 51 via holder 60*a*. For example, first motor 71 is driven to rotate output shaft 71*a* about the X axis, and thus, first optical member 51 rotates in a YZ plane about holder 60*a*. First motor 71 is configured to be rotatable not only in one direction but also in an opposite direction. For example, first motor 71 can rotate only in one direction, that is, in direction A illustrated in FIG. 2, or can rotate in both forward and reverse directions, that is, in both direction A and direction B illustrated in FIG. 2. A rotation frequency is variable, and can be changed in a range of about several Hz to several kHz when welding is performed. As will be described later, when beam control mechanism 20 is operated, first motor 71 does not continuously rotate in one direction but rotates in a predetermined angle range. In other words, first optical member 51 tilts at a predetermined angle about holder 60*a*. First motor 71 can quickly rotate first optical member 51 in a reciprocating manner within a set angle range.

The axis of output shaft 71*a* of first motor 71 corresponds to a tilt axis on which first optical member 51 is tilted.

First motor 71 is connected to controller 80 and is driven by a control signal from controller 80. First motor 71 is configured to move between the above-described first position and the outside of the optical path by a moving mechanism (not illustrated). Similarly, first optical member 51 coupled to first motor 71 moves between the first position and the outside of the optical path.

A thickness of first optical member 51 in the Z direction is about 1 mm to several mm, but is not particularly limited thereto. The thickness can be changed to another value as appropriate in a relationship between a moving distance of laser light LB on the end face of fiber bundle 90 and a rotation angle of first motor 71. When the thickness is about several mm, since the optical member is installed at a narrow position through which condensed laser light LB passes between condenser lens 30 and the incident end face of fiber bundle 90, a required size of the optical member is small, and first motor 71 can easily rotate the optical member in the reciprocating manner at a high speed, for example, at a rotation frequency of several kHz.

[Regarding Laser Light Incident Control on Selected Optical Fiber]

Next, a procedure for causing laser light LB to be incident on an optical fiber selected from among first to third optical fibers 91 to 93 will be described.

Figure 4A:
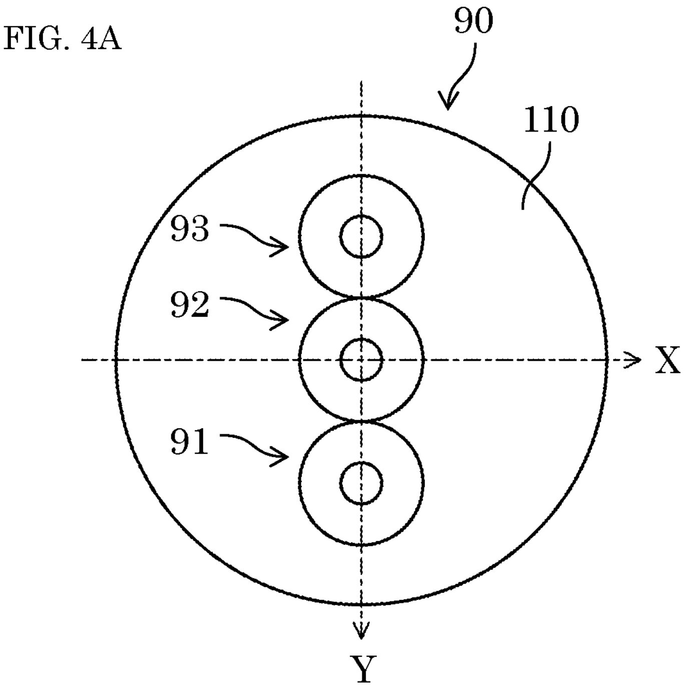
FIG. 4A is a schematic cross-sectional view of a fiber bundle.
Figure 4A:
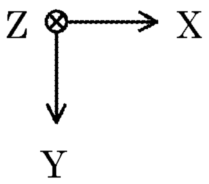
Figure 4B:
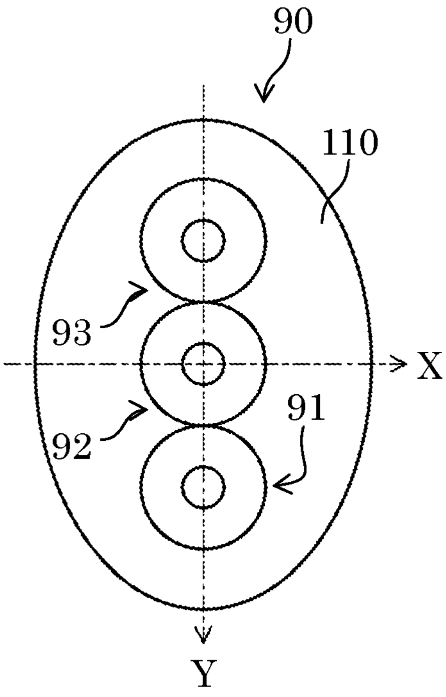
FIG. 4B is a schematic cross-sectional view of the fiber bundle.
Figure 5:
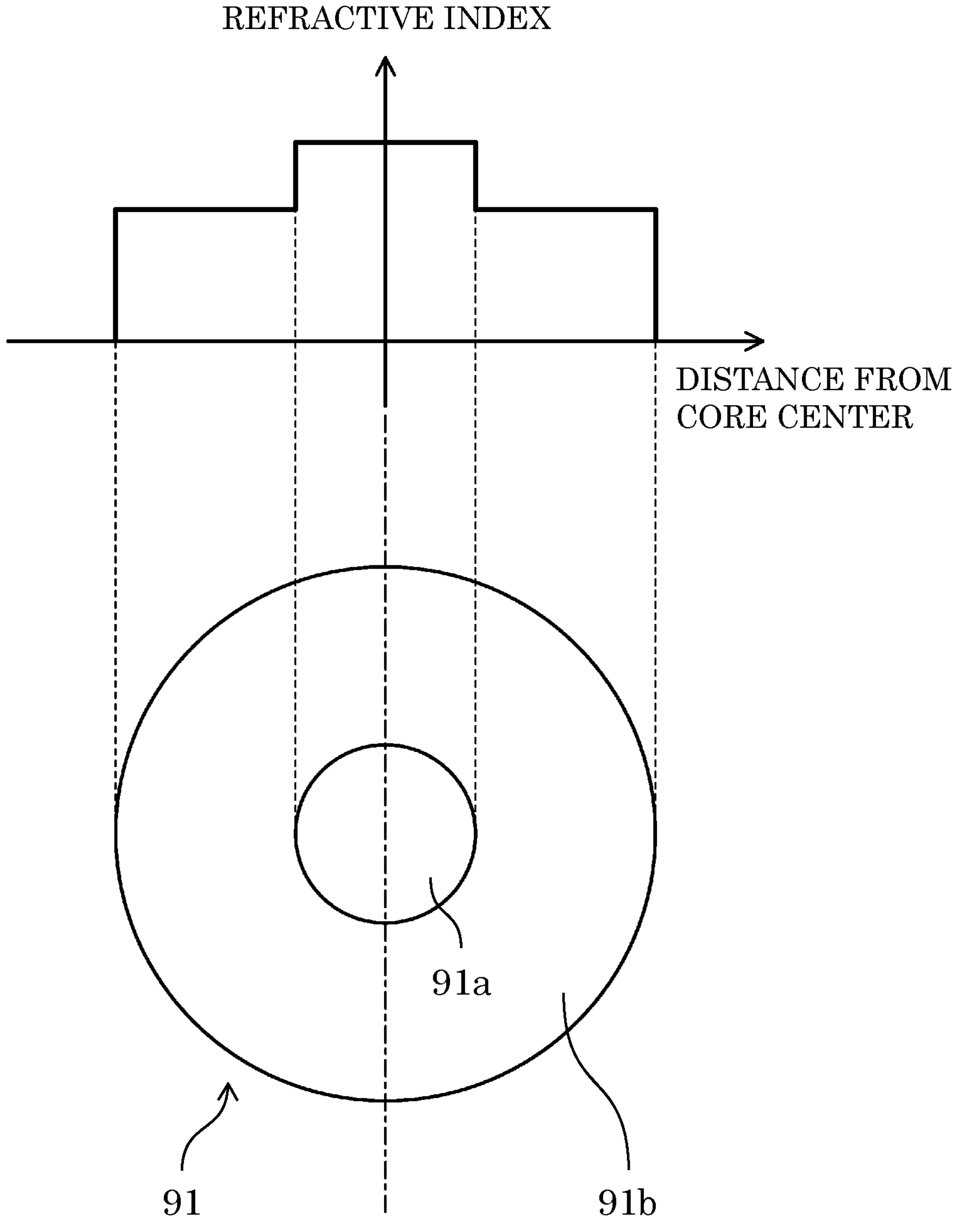
FIG. 5 is a schematic diagram illustrating a cross-sectional structure and a refractive index distribution of a first optical fiber.

FIGS. 4A and 4B are schematic cross-sectional views of the fiber bundle, and FIG. 5 illustrates a cross-sectional structure and a refractive index distribution of the first optical fiber. FIG. 4A illustrates a case where a cross section of the fiber bundle has a circular outer shape, and FIG. 4B illustrates a case where the cross section of the fiber bundle has an elliptical outer shape. Although not illustrated, second optical fiber and third optical fibers 92 and 93 also have the same structure as that illustrated in FIG. 5. First to third fibers 91 to 93 are disposed such that optical axes coincide with a Y axis.

At the time of performing welding, when for example, laser light LB is caused to be incident on first optical fiber 91, first optical member 51 is first disposed at the above-described first position in a state in which laser oscillation is not performed. Subsequently, when laser oscillation is performed and laser light LB is emitted from the laser resonator, first motor 71 is rotated at a predetermined angle in direction A illustrated in FIG. 2 by a control signal from controller 80, first optical member 51 tilts at a predetermined angle in the YZ plane about holder 60*a* according to the rotation of first motor 71. According to this angle, an angle between a light incident surface of first optical member 51 and the optical axis of laser light LB changes, and the optical path of laser light LB is changed inside first optical member 51. Laser light LB of which the optical axis is changed is incident on the incident end face of first optical fiber 91. In this case, a tilt angle of first optical member 51 is adjusted such that laser light LB is incident on core 91*a* of first optical fiber 91. A refractive index of core 91*a* is higher than a refractive index of first cladding 91*b*, and incident laser light LB is confined in core 91*a* and propagates through first optical fiber 91.

Similarly, when laser light LB is caused to be incident on second optical fiber 92, first optical member 51 is rotated at another angle by first motor 71. Thus, laser light LB moves by a predetermined distance in the Y direction on the incident end face of bundle fiber 90 and is incident on the core of second optical fiber 92. When laser light LB is caused to be incident on third optical fiber 93, first optical member 51 is further rotated at another angle by first motor 71. Thus, laser light LB moves by a predetermined distance in the Y direction on the incident end face of bundle fiber 90 and is incident on the core of third optical fiber 93.

In this manner, first motor 71 is driven to tilt first optical member 51 disposed on the optical path of laser light LB at a different angle, and thus, it is possible to select an optical fiber on which laser light LB is incident from among first to third optical fibers 91 to 93 included in fiber bundle 90. Accordingly, it is possible to select a laser light emitting head from which laser light LB is emitted.

The selection of the optical fiber on which laser light LB is incident, a switching timing of the incidence of laser light LB, and the like are performed in accordance with control signals from controller 80 based on the laser processing program. When the welding is ended, first optical member 51 may move to the outside of the optical path. Needless to say, the first optical member may not move.

In the above description, although the case where laser light LB is inserted into first to third optical fibers 91 to 93 in order has been described, this insertion is performed for the sake of convenience, and the order may not be this order. When a position of fiber bundle 90 is determined in advance such that laser light LB enters the core of second fiber 92 at a center position of fiber bundle 90 in a state in which first optical member 51 moves to the outside of the optical path, laser light LB enters only second fiber 92. In this case, it is possible to maintain first optical member 51 in a state of moving to the outside of the optical path.

[Effects and Others]

As described above, laser processing device 1000 according to the present exemplary embodiment includes at least laser oscillator 10 that generates laser light LB, fiber bundle 90 formed by bundling first to third optical fibers 91 to 93 so as to have a predetermined arrangement relationship, beam control mechanism 20 provided in laser oscillator 10, and first to third laser light emitting heads 121 to 123 attached to the emission ends of the first to third optical fibers and emitting laser light LB toward workpieces 201 to 203, respectively.

Beam control mechanism 20 includes at least condenser lens 30 that receives laser light LB and condenses laser light LB at a predetermined magnification, first optical path changing mechanism 41 that is disposed on the optical path of laser light LB traveling between condenser lens 30 and the incident end face of fiber bundle 90 and changes the optical path of laser light LB, and controller 80 that controls an operation of first optical path changing mechanism 41.

Beam control mechanism 20 causes laser light LB to be incident on an optical fiber selected from among first to third optical fibers 91 to 93, for example, the first optical fiber, and causes laser light LB to be emitted from first laser light emitting head 121 attached to first optical fiber 91.

The laser light emitting heads from which laser light LB is emitted are appropriately switched by using laser processing device 1000 as illustrated in FIG. 1, and thus, a large amount of workpieces is often laser-machined in a factory or the like. In this case, laser oscillator 10 connected to the plurality of laser light emitting heads is shared, and thus, it is possible to reduce a size and an area of laser processing device 1000.

In laser processing device 1000, beam control mechanism 20 described above is provided in laser oscillator 10, and thus, it is possible to easily and quickly switch the laser light emitting head from which laser light LB is emitted. Accordingly, it is possible to reduce a number of man-hours and time required to switch between the laser light emitting heads, and it is possible to reduce the cost of laser processing.

First optical member 51 is provided to be movable between a predetermined position (first position) on the optical path of laser light LB traveling between condenser lens 30 and the incident end faces of first to third optical fibers 91 to 93 and the outside of the optical path.

As described above, the optical path of laser light LB can be easily changed by disposing first optical path changing mechanism 41 on the optical path of laser light LB between condenser lens 30 and the incident end face of fiber bundle 90. For example, as described in PTL 2, even though the optical member is disposed in front of condenser lens 30, since laser light LB after passing through condenser lens 30 forms an image at the focal position, the optical path of the laser light cannot be changed.

On the other hand, according to the present exemplary embodiment, it is possible to easily and quickly switch between the optical fibers from which laser light LB is emitted, and eventually the laser light emitting heads by disposing first optical member 51 having the parallel plate shape at the above-described first position and tilting first optical member 51 by first motor 71. In particular, when the thickness of first optical member 51 is about 1 mm to several mm, since the optical member is installed at the narrow position through which condensed laser light LB passes between condenser lens 30 and fiber bundle 90, the required size of the optical member is small, and it is easy to quickly tilt the optical member by first motor 71. It is easy to rotate the optical member in the reciprocating manner with the predetermined angle range. Accordingly, the laser light emitting heads from which laser light LB is emitted can be quickly switched.

It is preferable that laser light LB is converted into the collimated light before being incident on condenser lens 30.

In this manner, since the optical path and the optical axis of laser light LB emitted from condenser lens 30 are constant, the optical path of laser light LB can be easily changed by first optical path changing mechanism 41.

In the present exemplary embodiment, although the configuration in which three optical fibers 91 to 93 are bundled in fiber bundle 90 is illustrated, but the present invention is not particularly limited thereto. When a number of optical fibers is increased, the optical fibers may be provided in a Y-axis direction adjacent to optical fiber 93 or optical fiber 91.

Figure 6:
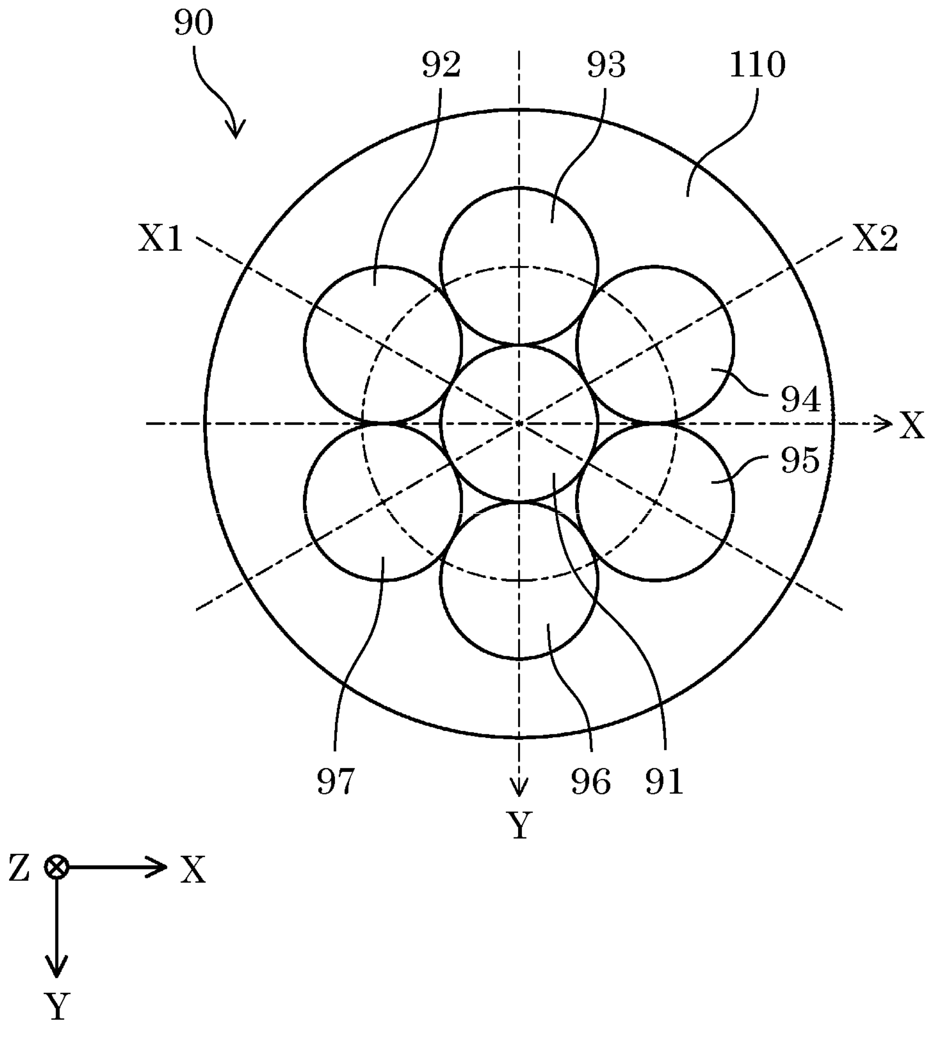
FIG. 6 is a schematic cross-sectional view of another fiber bundle.
Figure 7:
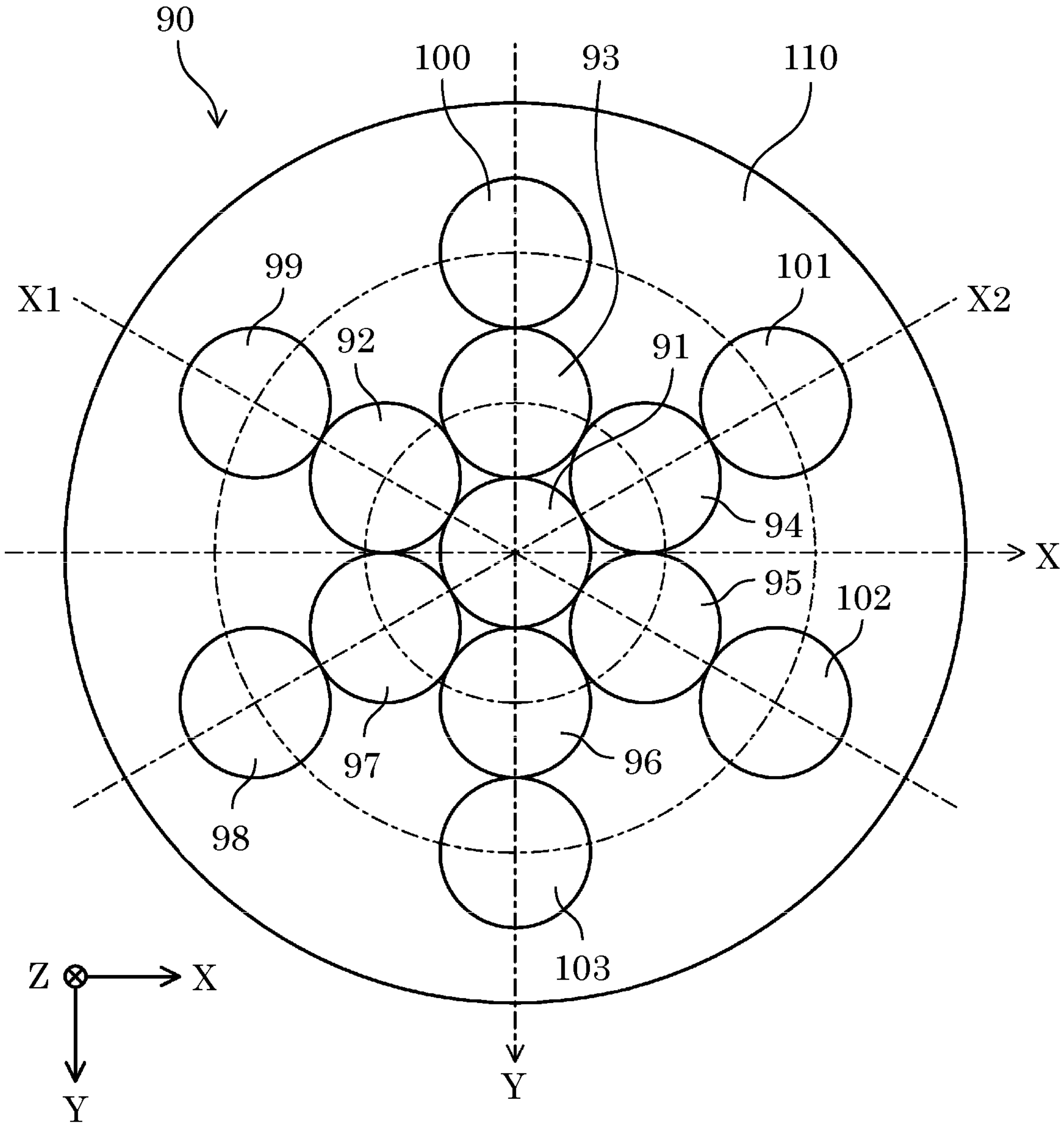
FIG. 7 is a schematic cross-sectional view of still another fiber bundle.

FIG. 6 illustrates a schematic cross-sectional view of another fiber bundle, and FIG. 7 illustrates a schematic cross-sectional view of still another fiber bundle.

According to laser processing device 1000 according to the present exemplary embodiment, a number of optical members and a number of motors coupled to the optical members are increased according to the number of optical fibers included in fiber bundle 90, and thus, in fiber bundle 90 having a configuration illustrated in FIG. 6 or 7, laser light LB generated by laser oscillator 10 can be caused to be incident on any of optical fibers 91 to 103 included in the fiber bundle. Accordingly, a number of laser light emitting heads connected to one laser oscillator 10 can be increased, and the size and area of laser processing device 1000 can be further reduced. It is possible to further reduce the number of man-hours and time required to switch between the laser light emitting heads, and eventually, it is possible to reduce the cost of laser processing.

In order to easily change the optical fiber on which laser light LB is incident by the optical path changing mechanism, it is preferable that first optical fiber 91 is disposed at the center and the other optical fibers are disposed on a concentric circumference from the center as illustrated in FIGS. 6 and 7. In this case, it is preferable that angles formed by the centers of the optical fibers adjacent to each other on the concentric circumference and the center of first optical fiber 91 are substantially the same. As illustrated in FIG. 7, there may be a plurality of concentric circles in which the optical fibers are disposed. In this case, it is preferable that the optical fibers are disposed at positions facing each other with first optical fiber 91 interposed therebetween. As illustrated in FIGS. 6 and 7, when the number of optical fibers is increased, the optical fibers may be provided in the X1 or X2 direction forming 60 degrees in a clockwise direction or a counterclockwise direction of the Y-axis direction in addition to the Y-axis direction. The control of laser light LB at this time will be described later.

In this manner, since the optical fibers can be disposed at symmetrical positions with first optical fiber 91 as the center, an operation of the optical path changing mechanism can be simplified, and the optical fiber on which laser light LB is incident can be easily changed.

First Modification Example

Figure 8:
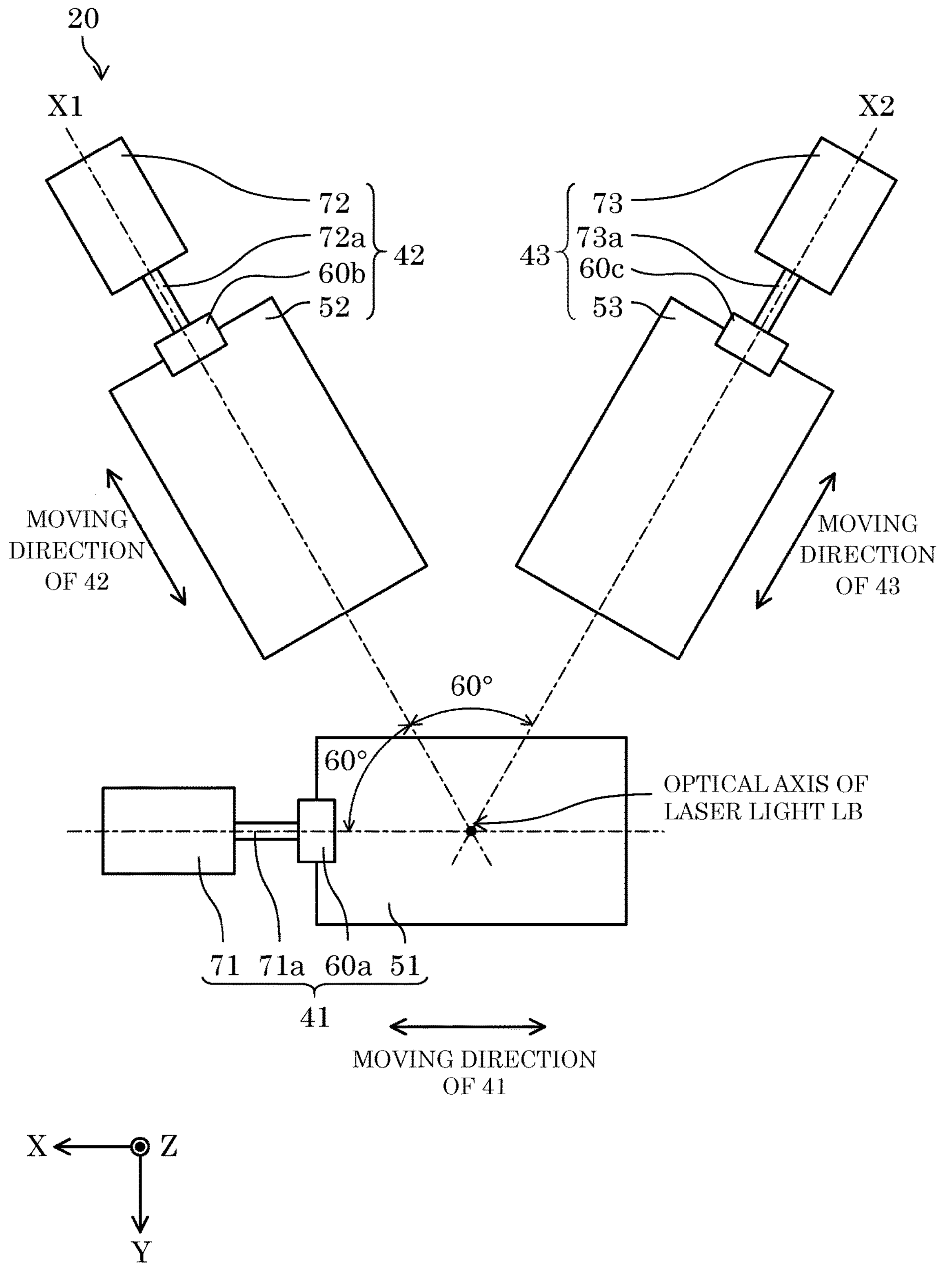
FIG. 8 is a schematic diagram of the beam control mechanism as viewed from the Z direction.
Figure 9:
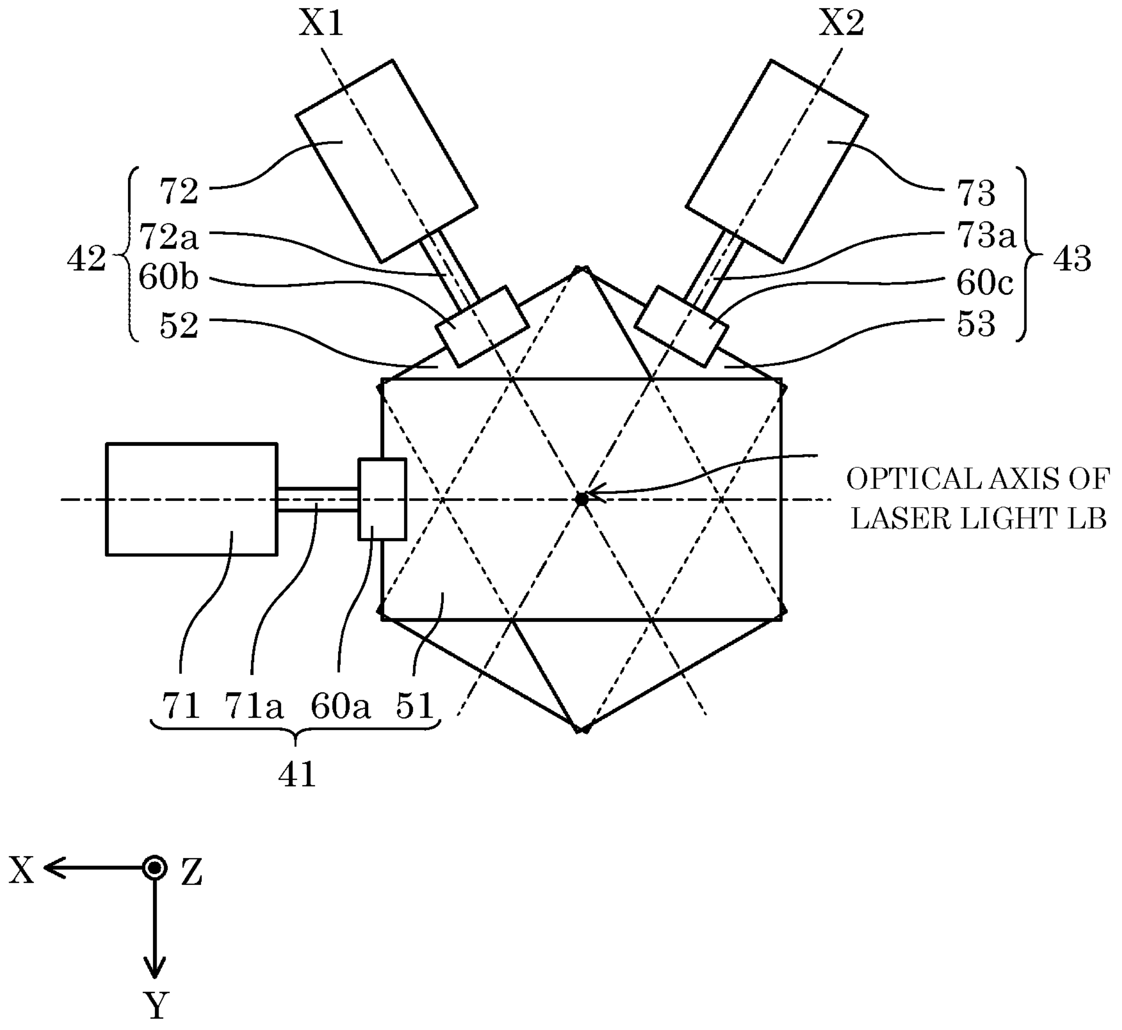
FIG. 9 is a schematic diagram of a beam control mechanism according to a first modification example as viewed from the Z direction.

FIGS. 8 and 9 are schematic diagrams of a beam control mechanism according to the present modification example as viewed from the Z direction. In FIGS. 8 and 9, the same portions as the portions in the first exemplary embodiment are denoted by the same reference marks, and the detailed description will be omitted.

In the configuration according to the present modification example, in addition to first optical path changing mechanism 41, second and third optical path changing mechanisms 42 and 43 are added to the configuration example illustrated in FIGS. 2 and 3.

The direction in which output shaft 71*a* of first motor 71 of the first optical path changing mechanism 41 extends coincides with the X direction, and directions in which output shafts 72*a* and 73*a* of second and third motors 72 and 73 of second and third optical path changing mechanism 42 and 43 extend coincide with an X1 axis and an X2 axis forming 60 degrees with the clockwise direction or the counterclockwise direction of the X direction on the XY plane. Similarly to first optical member 51, the second and third optical members are provided so as to be movable between the same position (first position) on the optical path of laser light LB traveling between condenser lens 30 and the incident end face of fiber bundle 90 and the outside of the optical path. FIG. 8 is a schematic diagram when first optical member 51 is on the optical path of laser light LB and second and third optical members 52 and 53 are outside of the optical path. On the other hand, FIG. 9 is a schematic diagram when all first to third optical members 51 to 53 are on the optical path of laser light LB, but actually, all first to third optical members 51 to 53 are not on the optical path of laser light LB. Controller 80 selects any one of first to third optical members 51 to 53, and disposes the selected optical member on the optical path of laser light LB. Controller 80 disposes two unselected optical paths outside of the optical path.

An operation of the present modification example will be described. Since a basic operation of first optical path changing mechanism 41 is similar to the operation described in the first exemplary embodiment, the detailed description will be omitted. Operations of second and third optical path changing mechanisms 42 and 43 are also similar to the operation of first optical path changing mechanism 41. That is, when second motor 72 is driven, second optical member 52 rotates about output shaft 72*a* to change the optical path of the light passing through second optical member 52. When third motor 73 is driven, third optical member 53 rotates about output shaft 73*a* to change the optical path of the light passing through third optical member 53.

When laser light LB is incident on the optical fiber on the Y axis at the time of performing welding, first, first optical member 51 is disposed at the above-described first position in a state in which laser oscillation is not performed, first motor 71 is controlled such that laser light LB is incident on the optical fiber on the Y axis, and the laser resonator is caused to oscillate to perform welding. When the welding is ended, the laser oscillation is stopped, and first optical member 51 is moved to the outside of the optical path. When laser light LB is incident on the optical fiber on the X1 axis to perform welding, third optical member 53 may be disposed at the above-described first position, and third motor 73 may be controlled such that laser light LB is incident on the optical fiber on the X1 axis. When laser light LB is incident on the optical fiber on the X2 axis to perform welding, second optical member 52 may be disposed at the above-described first position, and second motor 72 may be controlled such that laser light LB is incident on the optical fiber on the X2 axis.

Second Modification Example

In the first modification example, first to third optical members 51 to 53 are provided at the same position (first position) on the optical path of laser light LB traveling between condenser lens 30 and the incident end face of fiber bundle 90, but may be provided at different positions. This example will be described with reference to FIG. 10.

Figure 10:
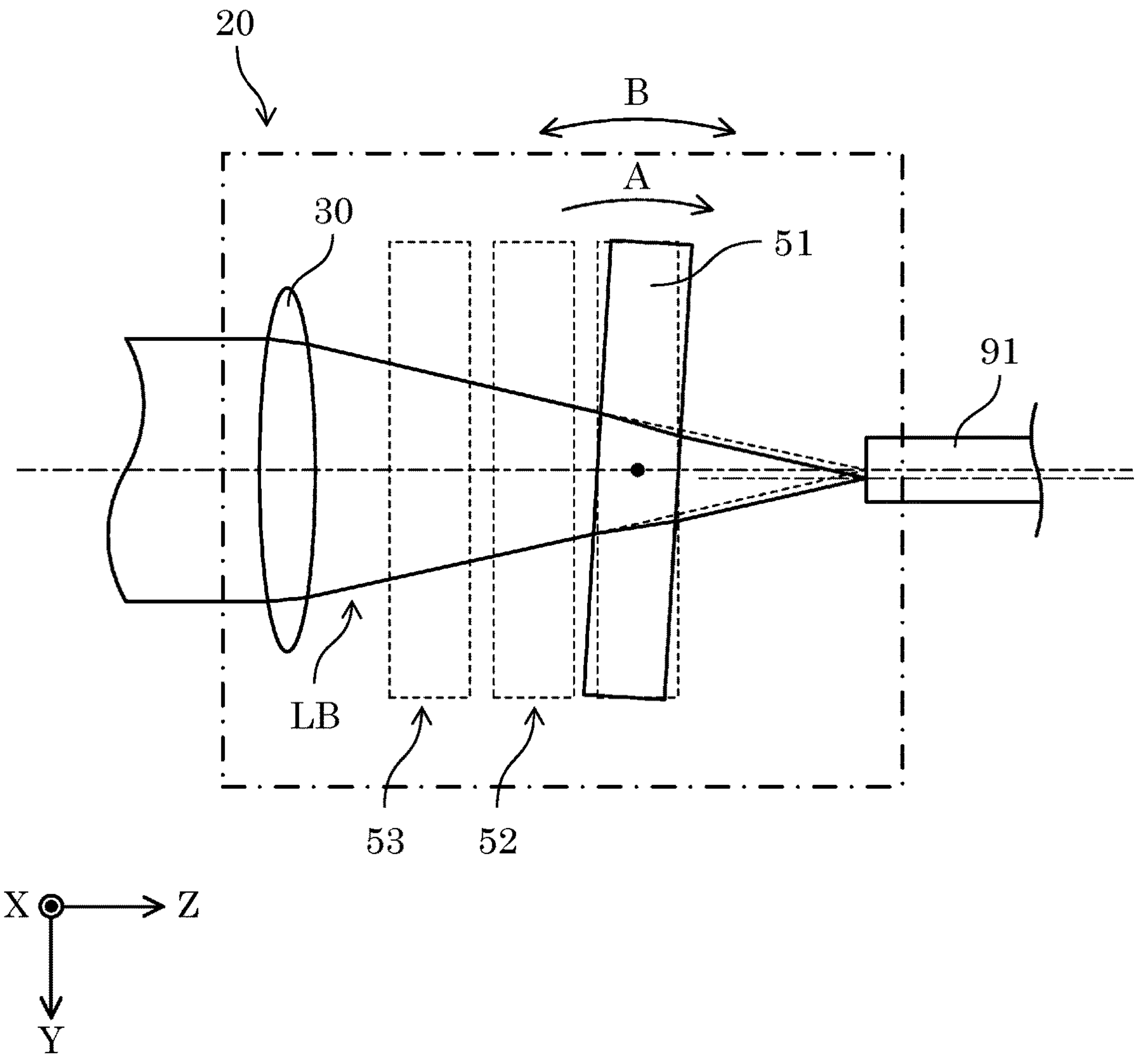
FIG. 10 is a schematic diagram of a beam control mechanism according to a second modification example as viewed from the X direction.

FIG. 10 is a schematic diagram of a beam control mechanism according to a second modification example as viewed from the X direction. The same portions as the portions in the first exemplary embodiment or the first modification example are denoted by the same reference marks, and the detailed description will be omitted.

A configuration according to the present modification example is different from the configuration illustrated in the first modification example in that first to third optical members 51 to 53 are disposed at different positions on the optical path of laser light LB. Specifically, when first optical member 51 is disposed on the optical path of laser light LB, the first optical member is disposed at the same position as the position in the first exemplary embodiment, second optical member 52 is disposed at a position closer to condenser lens 30 than the first position is, and third optical member 53 is disposed at a position closer to condenser lens 30 than second optical member 52 is. Accordingly, first to third motors 71 to 73 are also disposed at positions at predetermined intervals along the optical axis of laser light LB.

Beam control mechanism 20 may have such a configuration. In the configuration illustrated in the first modification example, for example, after first optical member 51 is completely moved to the outside of the optical path of laser light LB, second optical material 52 or third optical material 53 can be moved to the first position of laser light LB. On the other hand, in the second modification example, for example, second optical material 52 or third optical material 53 can be moved to a predetermined position of laser light LB while first optical member 51 is moved to the outside of the optical path of laser light LB. Thus, it is possible to shorten a switching time before another optical fiber is illuminated by laser light LB.

Second Exemplary Embodiment

Figure 11:
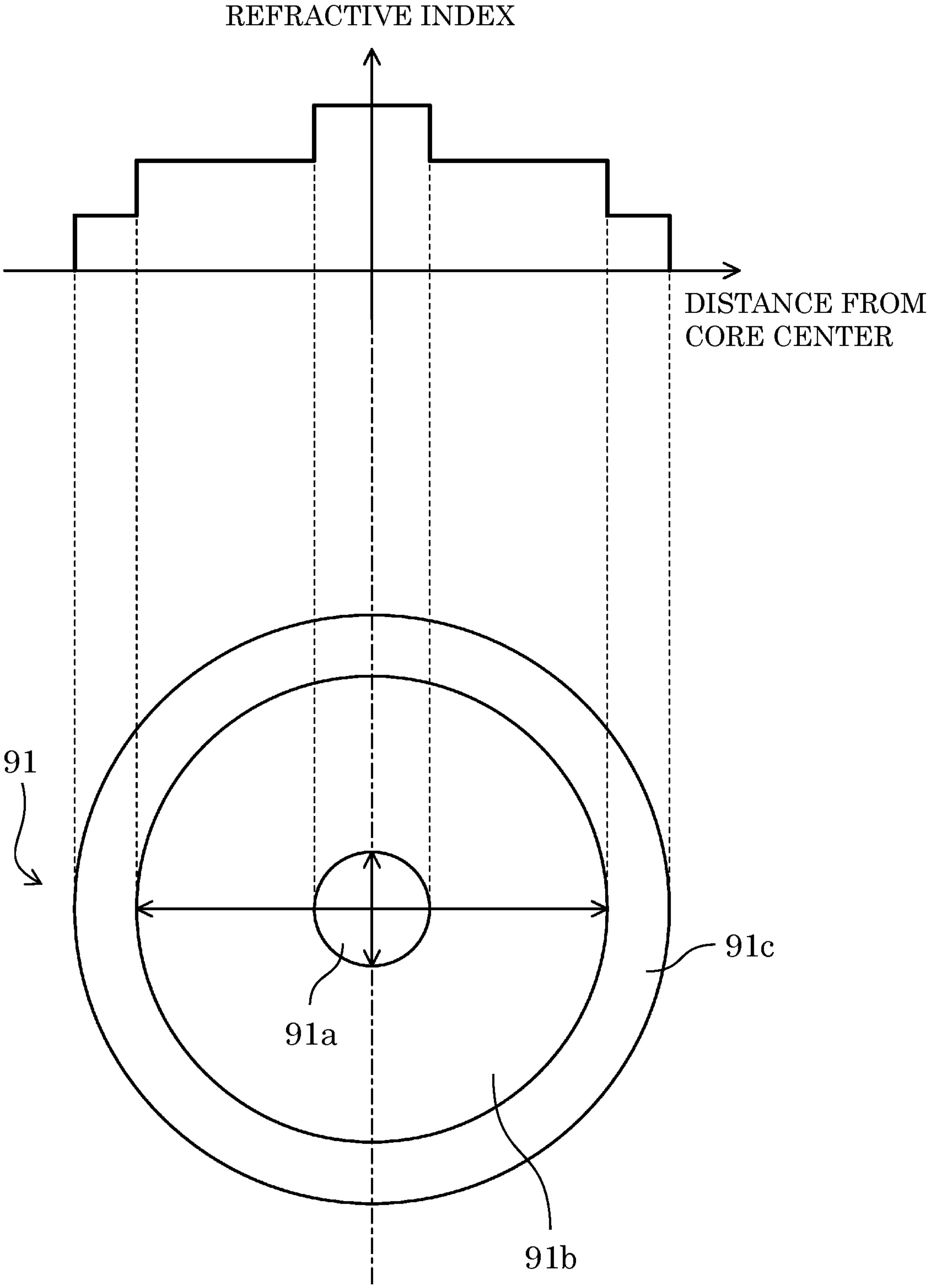
FIG. 11 is a schematic diagram illustrating a cross-sectional structure and a refractive index distribution of a first optical fiber.

FIG. 11 illustrates a cross-sectional structure and a refractive index distribution of the first optical fiber according to the present exemplary embodiment.

The present exemplary embodiment is different from the first exemplary embodiment in that each of the optical fibers included in fiber bundle 90 is a so-called multi-clad fiber.

For example, as illustrated in FIG. 11, first optical fiber 91 includes core 91*a*, first cladding 91*b* provided coaxially with core 91*a* on an outer peripheral side of core 91*a*, and second cladding 91*c* provided coaxially with core 91*a* on an outer peripheral side of first cladding 91*b*. Core 91*a*, first cladding 91*b*, and second cladding 91*c* are mainly made of quartz, and as illustrated in FIG. 11, a refractive index of core 91*a* is the highest, and refractive indexes of first cladding 91*b* and second cladding 91*c* decrease in this order. The refractive indexes of first cladding 91*b* and second cladding 91*c* may be adjusted by doping substances of different types or concentrations with which both the refractive indexes can be decreased. The refractive index of core 91*a* may also be adjusted by doping substances of different types or concentrations with which the refractive indexes can be increased. In first optical fiber 91 having such a refractive index distribution, laser light LB incident on core 91*a* at a predetermined angle can propagate in core 91*a* without entering first cladding 91*b*, but laser light LB incident on first cladding 91*b* at a predetermined angle can propagate in first cladding 91*b* without entering second cladding 91*c*. As a structure of the optical fiber for achieving such a propagation method of laser light LB, the structure illustrated in FIG. 10 is merely an example, and core 91*a*, first cladding 91*b*, and second cladding 91*c* do not necessarily have different refractive indexes. For example, core 91*a*, first cladding 91*b*, and second cladding 91*c* may have same refractive index N1, and a thin layer having refractive index N2 ($N2<N1$) may be provided between core 91*a* and first cladding 91*b* and between first cladding 91*b* and second cladding 91*c*. Thus, laser light LB incident on core 91*a* at the predetermined angle can propagate in core 91*a* without entering first cladding 91*b*, but laser light LB incident on first cladding 91*b* at the predetermined angle can propagate in first cladding 91*b* without entering second cladding 91*c*. The layer having refractive index N2 is mainly made of quartz, but may be doped with a substance with which the refractive index can be decreased. Laser light LB incident on first optical fiber 91 propagates through core 91*a* and/or first cladding 91*b*, and reaches the emission end of first optical fiber 91. Although not illustrated, a film or a resin-based protective layer that mechanically protects first optical fiber 91 is provided on an outer peripheral surface of second cladding 91*c*.

The incident position of laser light LB on the incident end face of first optical fiber 91 can be changed by using first optical fiber 91 and precisely adjusting the tilt angle of first optical member 51 disposed on the optical path of laser light LB. A further description will be given below.

Figure 12:
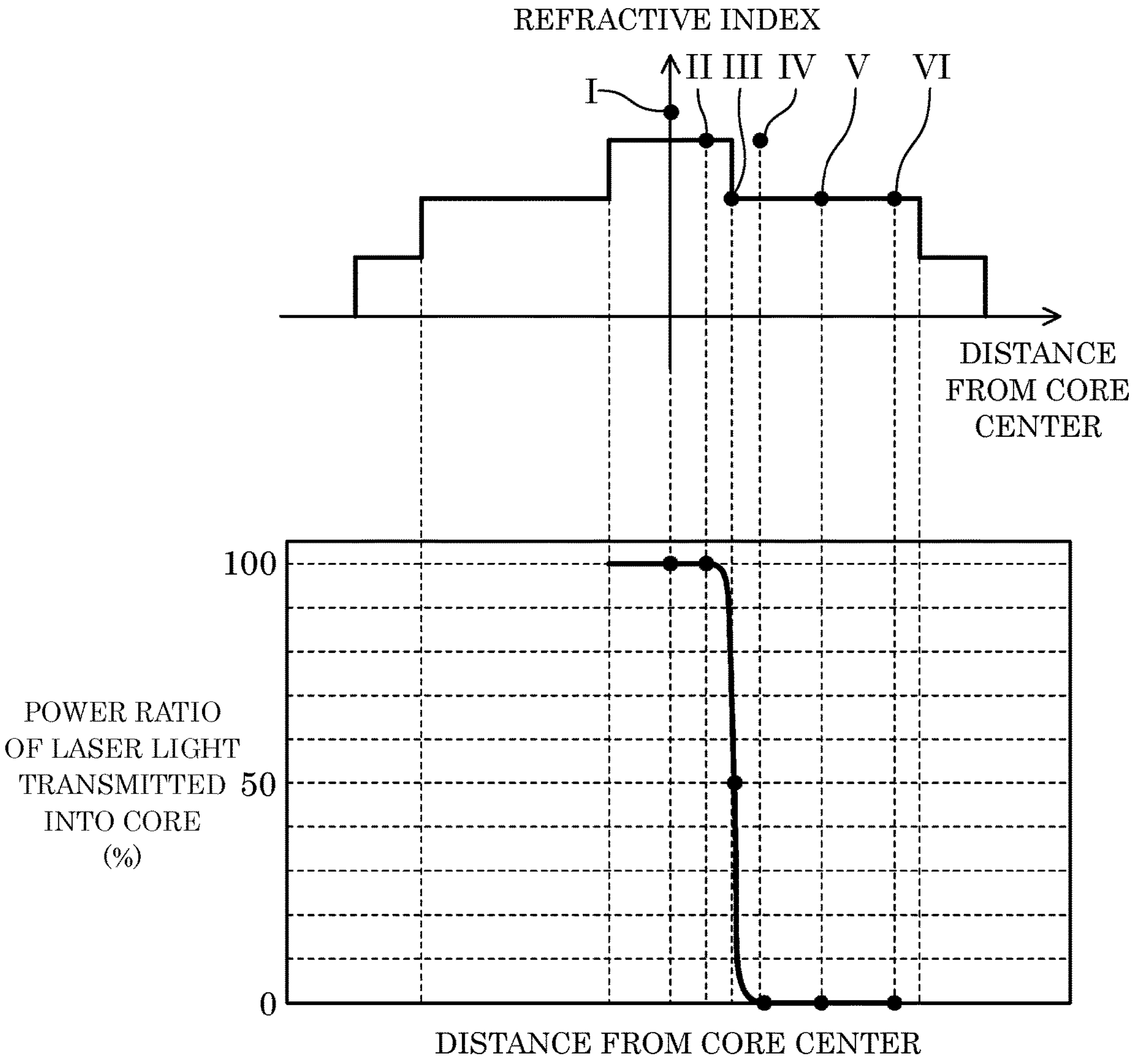
FIG. 12 is a diagram illustrating a relationship between an incident position of laser light on an incident end face of the first optical fiber and a power ratio of laser light transmitted into a core.
Figure 13:
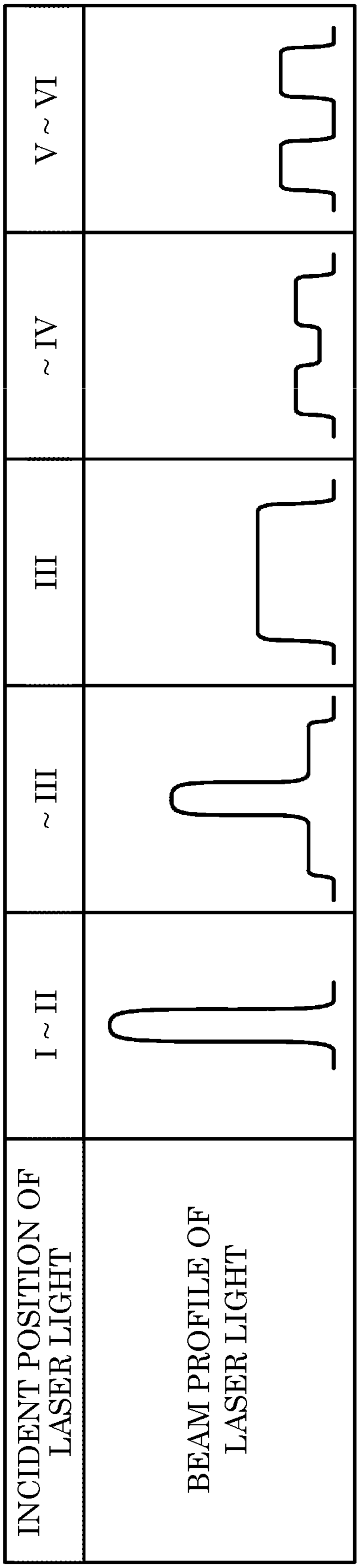
FIG. 13 is a diagram illustrating a relationship between the incident position of the laser light on the incident end face of the first optical fiber and a beam profile of laser light emitted from a first laser light emitting head.

FIG. 12 illustrates a relationship between the incident position of the laser light on the incident end face of the first optical fiber and the power ratio of the laser light transmitted into the core, and FIG. 13 illustrates a relationship between the incident position of the laser light on the incident end face of the first optical fiber and a beam profile of the laser light emitted from the first laser light emitting head. The beam profile illustrated in FIG. 13 corresponds to a power distribution of laser light LB that is emitted from first laser light emitting head 121 and forms an image at a focal position. The beam profile illustrated in FIG. 13 also corresponds to a power distribution of laser light LB emitted from the emission end of first optical fiber 91.

When the incident position of laser light LB is I illustrated in FIG. 12, 100% of laser light LB incident inside core 91*a*, and the beam profile of laser light LB has a unimodal shape with a narrow half-width as illustrated in FIG. 13 (incident position of laser light LB: I).

Similarly, until the incident position of laser light LB approaches first cladding 91*b* from core 91*a* and reaches position II illustrated in FIG. 12, 100% of laser light LB is incident on core 91*a*, and the beam profile is maintained in the unimodal shape.

On the other hand, when the incident position of laser light LB is between II and III illustrated in FIG. 12, that is, when laser light LB is incident up to near a boundary portion between core 91*a* and first cladding 91*b*, several % to 50% or less of laser light LB is incident on first cladding 91*b*. Thus, as illustrated in FIG. 13, the beam profile changes so as to include a unimodal portion and terrace portions having a wide half-width formed on both sides of the unimodal portion (incident position of laser light LB: ~III). The former corresponds to laser light LB incident on core 91*a*, and the latter corresponds to laser light LB transmitted into first cladding 91*b*. As the power ratio of laser light LB transmitted into core 91*a* decreases, a peak value of the unimodal portion decreases.

When the incident position of laser light LB is position III illustrated in FIG. 12, the power ratio of laser light LB incident on core 91*a* is equal to the power ratio of laser light LB incident on first cladding 91*b*. When the power density in a cross-sectional area of core 91*a* is equal to the one in a cross-sectional area of first cladding 91*b*, a peak value of the unimodal portion and peak values of the terrace portions of the beam profile coincide. As illustrated in FIG. 13, the entire beam profile of laser light LB has a unimodal shape, but a peak value is low and the half-width is large as compared with a case where laser light LB is incident on only core 91*a* (incident position of laser light LB: III). On the other hand, when the power density in the cross-sectional area of core 91*a* is high than the cross-sectional area of first cladding 91*b*, as illustrated in FIG. 13, the beam profile has a shape including a unimodal portion and terrace portions having a wide half-width formed on both sides of the unimodal portion (incident position of laser light LB: ~III). When the power density in the cross-sectional area of core 91*a* is smaller than the one in the cross-sectional area of first cladding 91*b*, the beam profile has a bimodal shape (incident position of laser light LB: ~IV) as illustrated in FIG. 13.

As the incident position of laser light LB moves away from core 91*a* (between III and IV illustrated in FIG. 12), a power of laser light LB incident on core 91*a* decreases, and a power ratio of laser light LB incident on first cladding 91*b* increases. As a result, as illustrated in FIG. 13, a peak value of a portion of the beam profile corresponding to a component transmitted into core 91*a* decreases, a peak value of a portion corresponding to a component transmitted into first cladding 91*b* increases, and the beam profile has a bimodal shape (incident position of laser light LB: ~IV). The peak value in the beam profile of the bimodal shape is lower than the peak value of the beam profile of the unimodal shape obtained when the incident position of laser light LB is I illustrated in FIG. 12. Although not illustrated, when the incident position of the laser is further separated from core 91*a* (between IV and V illustrated in FIG. 12), the power of laser light LB incident on core 91*a* becomes 0%, and 100% of laser light LB is incident on first cladding 91*b*.

When the incident position of laser light LB is completely within first cladding 91*b* (positions of V to VI illustrated in FIG. 12), as illustrated in FIG. 13, the peak value of the portion of the beam profile corresponding to the component transmitted into core 91*a* decreases to 0%, the peak value of the portion corresponding to the component transmitted into first cladding 91*b* is maximized, and the beam profile has a bimodal shape with a highest peak value (in the case of the incident positions of laser light LB: V to VI). The peak value in the beam profile of the bimodal shape is lower than the peak value of the beam profile of the unimodal shape obtained when the incident position of laser light LB is I illustrated in FIG. 13.

As described above, the incident position of laser light LB is changed, and thus, the beam profile, that is, the power distribution of laser light LB emitted from first laser light emitting head 121 can be changed. That is, beam control mechanism 20 is configured to switch between the power distributions of laser light LB emitted from first laser light emitting head 121 during laser processing of workpiece 201.

The beam profile of laser light LB emitted from first laser light emitting head 121 is changed, and thus, it is possible to improve a machined shape of workpiece 201, for example, a welded shape. A further description will be given below.

Figure 14:
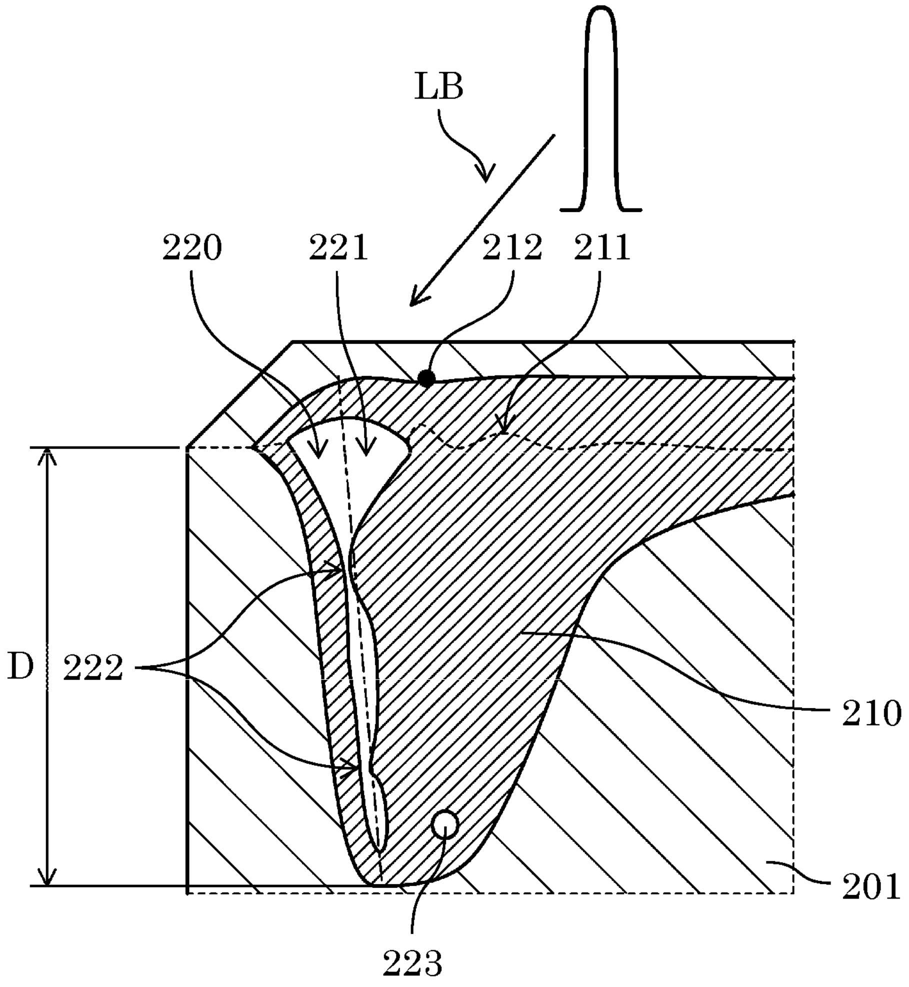
FIG. 14 is a schematic cross-sectional view of a welded portion of a workpiece for comparison.
Figure 15:
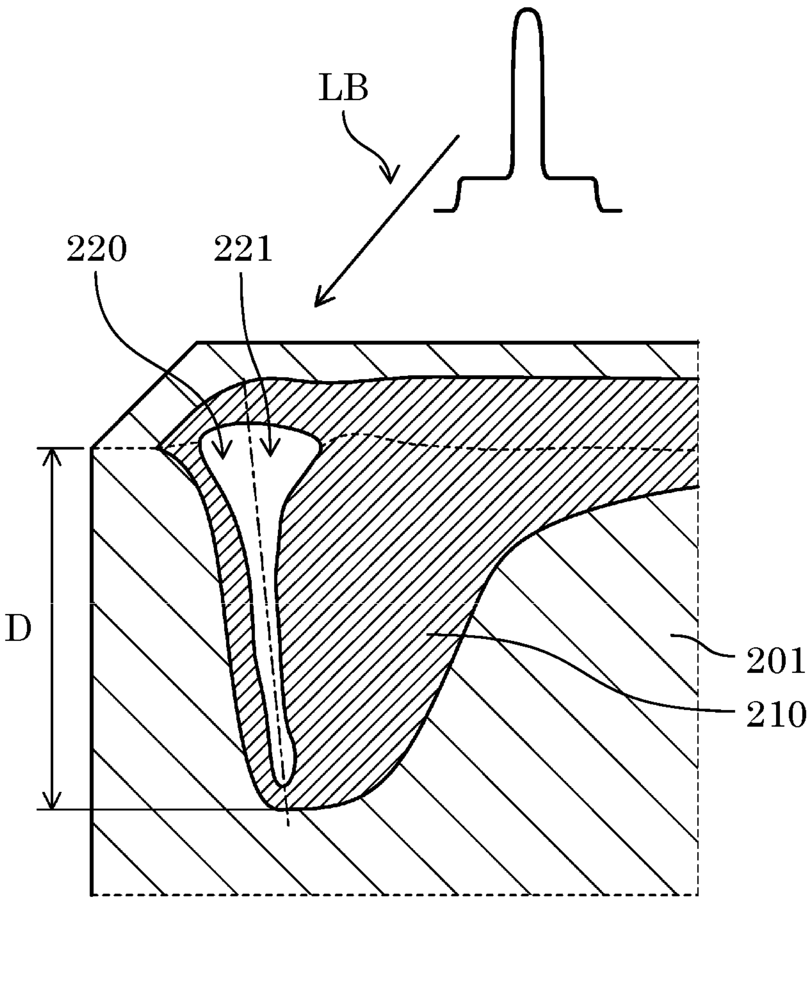
FIG. 15 is a schematic cross-sectional view of a welded portion of the workpiece according to a second exemplary embodiment.

FIG. 14 is a schematic cross-sectional view of a welded portion of a workpiece for comparison, and FIG. 15 is a schematic cross-sectional view of a welded portion of the workpiece according to the present exemplary embodiment.

In general, when the workpiece made of metal is laser-welded, a portion illuminated by the laser light is heated to cause weld-penetration, and the molten pool is formed. In the portion illuminated by the laser light, a material constituting the workpiece evaporates on a surface, and the keyholes are formed inside the workpiece by a recoiling force by metal vapor.

In the example illustrated in FIG. 14, laser light LB is transmitted only into core 91*a* of first optical fiber 91 and is illuminated to workpiece 201 from first laser light emitting head 121, and a power density of laser light LB at the welded portion is high and a spot diameter of illuminated laser light LB is small.

In such a case, the weld-penetration of workpiece 201 is likely to be formed, and keyhole 220 becomes deep. Meanwhile, opening 221 of keyhole 220 does not expand so much, and as illustrated in FIG. 14, constricted portion 222 may be generated inside keyhole 220. Constricted portion 222 is closed, and thus, air bubbles 223 remain inside workpiece 201. When closed constricted portion 222 becomes keyhole 220 again, the molten metal is rapidly ejected from the inside of keyhole 220 toward the surface. Thus, spatter 212 is formed and adhere to the surface of workpiece 201 or a surface of molten pool 210 is wavy. Since molten pool 210 is rapidly cooled and solidified after passage of laser light LB, when such a wave is generated, unevenness 211 (also referred to as rear vibration part 211) is caused on the surface of workpiece 201 at the rear of molten pool 210 along the traveling direction of the laser welding.

This wave is reflected at a boundary between molten pool 210 and the solidified portion and bounces back. When the reflected wave reaches keyhole 220, the reflected wave flows so as to fill keyhole 220. Since the flowed molten metal is rapidly heated by laser light LB, and metal vapor is rapidly generated, a cylindrical shape of keyhole 220 is disturbed. The shape disturbance of keyhole 220, the generation of air bubble 223, and spatter 212 and unevenness 211 caused on the surface of workpiece 201 described above are factors that deteriorate welding quality.

On the other hand, according to the present exemplary embodiment, the power distribution of laser light LB emitted from first laser light emitting head 121 toward workpiece 201 can be changed by using beam control mechanism 20. Thus, for example, workpiece 201 can be illuminated by laser light LB having the beam profile as illustrated in FIG. 15 by adjusting a tilt angle of first optical member 51 and changing the power ratio between laser light LB transmitted into core 91*a* of first optical fiber 91 and laser light LB transmitted into first cladding 91*b*.

In such a case, although weld-penetration depth D is slightly shallower than a depth in the case illustrated in FIG. 14, desired weld-penetration depth D is obtained by laser light LB emitted from core 91*a*. On the other hand, opening 221 of keyhole 220 can be expanded by laser light LB emitted from first cladding 91*b* as compared with the case illustrated in FIG. 14. Inner wall surfaces of keyholes 220 are also illuminated by laser light LB, and laser light LB is absorbed by workpiece 201 while laser light LB reaches the inside of keyholes 220 by multiple reflection. Accordingly, it is possible to prevent constricted portion 222 from being formed, and eventually, it is possible to prevent the inner wall surfaces of keyholes 220 from being stuck to generate air bubbles 223 inside workpiece 201. The molten metal from the inside of keyhole 220 toward the surface is prevented from being rapidly ejected, and thus, it is possible to reduce unevenness 211 formed on the surface of workpiece 201 at the rear of molten pool 210. It is possible to prevent the shape disturbance of keyhole 220. As described above, the welding quality in the laser welding can be improved.

The welding quality can be improved by switching between the power distributions of laser light LB emitted from first laser light emitting head 121 during the laser welding.

Figure 16:
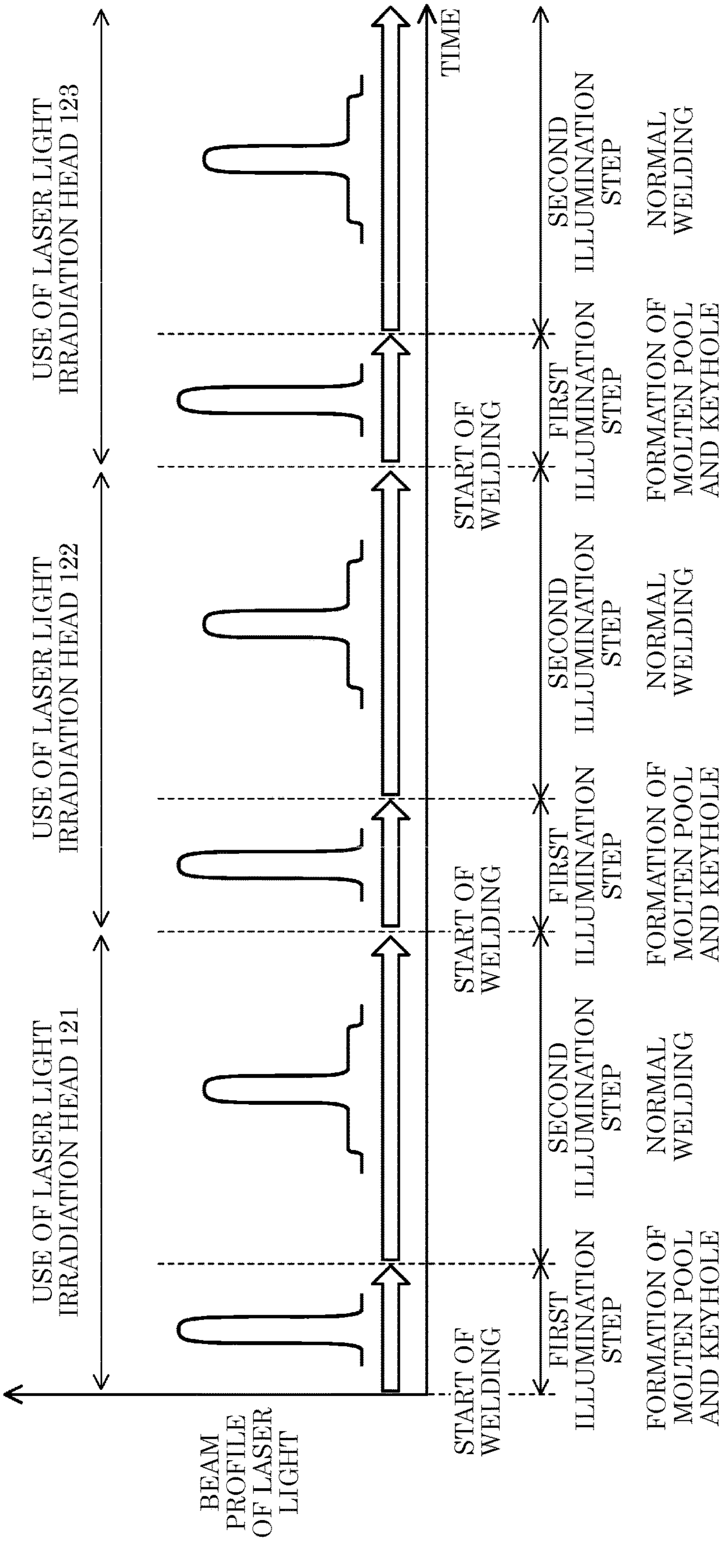
FIG. 16 is a welding sequence of a workpiece according to the second exemplary embodiment.

FIG. 16 illustrates a welding sequence of the workpiece, and molten pool 210 is not formed in workpiece 201 immediately after the start of welding. It is desired that desired weld-penetration depth D is obtained immediately after the start of welding. Thus, controller 80 drives first motor 71 to cause laser light LB to be incident on only core 91*a*. Accordingly, the spot diameter of laser light LB illuminated to workpiece 201 is reduced, and the power density of laser light LB at the welded portion is increased (first illumination step). On the other hand, after molten pool 210 and keyhole 220 are formed, it is desired that constricted portion 222 and the like as described above are prevented from being formed. Thus, controller 80 drives first motor 71 to cause laser light LB to be incident on core 91*a* and first cladding 91*b*. Accordingly, opening 221 of keyholes 220 is expanded, and desired weld-penetration depth D is obtained (second illumination step). When second laser light illumination head 122 and third laser light illumination head 123 are used, workpieces 202 and 203 are also laser-welded in the same sequence. In FIG. 16, the switching of laser light LB to second and third laser light illumination heads 122 and 123 is omitted.

In this manner, in the laser welding, molten pool 210 and keyhole 220 can reliably be formed in workpieces 201 to 203, and the welding quality can be improved by preventing air bubbles 223 inside workpieces 201 to 203, unevenness 211 on the surface, and the like from being generated.

The present invention is not limited thereto. Beam control mechanism 20 is operated according to the material of workpieces 201 to 203 and/or the shape of the portion of workpieces 201 to 203 to be laser-machined, and thus, the power distribution of laser light LB emitted from any one of the plurality of laser light emitting heads is controlled. Accordingly, workpieces 201 to 203 having various materials and shapes can be laser-machined, and processing quality can be improved.

Third Exemplary Embodiment

Figure 17:
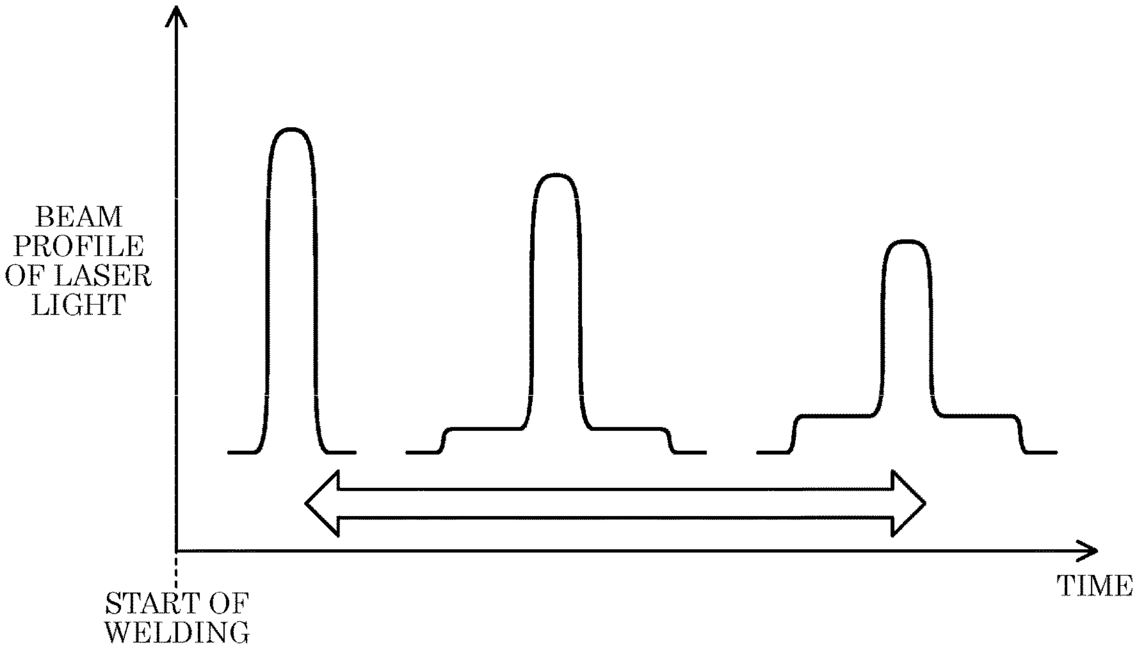
FIG. 17 is a diagram illustrating a periodic change of a beam profile of laser light.

FIG. 17 illustrates a periodic change of the beam profile of the laser light. First optical fiber 91 in the present exemplary embodiment is a multi-clad fiber as in the second exemplary embodiment.

In the present exemplary embodiment, first motor 71 is rotated in the reciprocating manner within a predetermined angle range, and thus, first optical member 51 also rotates in a reciprocating manner within a predetermined angle range accordingly. That is, beam control mechanism 20 is configured to periodically switch between the power distributions of laser light LB emitted from first laser light emitting head 121 during laser processing of workpiece 201. In the present exemplary embodiment, a rotation frequency of first optical member 51 is set to about several Hz to several kHz. Although not illustrated, second motor 72 and third motor 73 are also capable of rotating in a reciprocating manner within an angle range, and second optical member 52 and third optical member 53 also rotate in a reciprocating manner within a predetermined angle range accordingly.

In this case, as illustrated in FIG. 17, the power distribution of laser light LB emitted from an emission end of first laser light emitting head 121 changes periodically. Specifically, a beam profile having a unimodal peak changes to a beam profile having a bimodal peak continuously, and the change is periodically repeated. The rotation frequency of first optical member 51 corresponds to a frequency at which the power distribution of laser light LB changes.

In this manner, for example, keyhole 220 is prevented from being excessively narrowed while molten pool 210 and keyhole 220 are reliably formed in workpiece 201, and the laser welding in which the generation of air bubble 223 and spatter 212 is suppressed can be performed.

The power distributions of laser light LB are periodically switched at a predetermined frequency, in this case, at a frequency substantially equal to a natural vibration frequency of keyhole 220 formed in workpiece 201, and thus, it is possible to effectively prevent the shape of keyhole 220 from being disturbed by reducing unevenness 211 to be formed at the rear of molten pool 210 described above. A further description will be given below.

While molten pool 210 is sequentially formed along the traveling direction of the laser welding, keyhole 220 also moves along the traveling direction of the laser welding. At this time, keyhole 220 vibrates by repeating expansion and contraction in a diametrical direction and/or a depth direction and in a diametrical direction and/or a depth direction at a natural vibration frequency (hereinafter, simply referred to as a natural vibration frequency). The natural vibration frequency is a value determined by a size of molten pool 210, a viscosity at the time of melting constituent metal of the molten workpiece, and the like, and is estimated to be about several Hz to several kHz in many cases.

The power distribution of laser light LB illuminated to workpiece 201 is periodically changed at a frequency substantially equal to the natural vibration frequency, and thus, the shape of keyholes 220 is stabilized. It is possible to prevent constricted portion 222 from being generated inside workpiece 201 and air bubble 223 from being generated. Unevenness 211 formed at the rear of molten pool 210 can be reduced.

The method for periodically and continuously changing the power distribution of laser light LB described above is particularly effective for thick plate welding. This is because, since a required weld-penetration depth increases as a plate thickness increases and keyhole 220 also increases in order to achieve the weld-penetration depth, there is a high probability that a welding defect is generated due to instability (for example, constriction) of keyhole 220 increases.

Third Modification Example

When a shape of a portion of the workpiece to be laser-welded changes along the traveling direction of the laser welding, good laser welding can be performed by appropriately switching between the power distributions of laser light LB illuminated to the workpiece according to the shape of the portion to be welded. An exemplary case will be further described with reference to FIG. 18. First optical fiber 91 in the present modification example is a multi-clad fiber as in the second exemplary embodiment.

Figure 18:
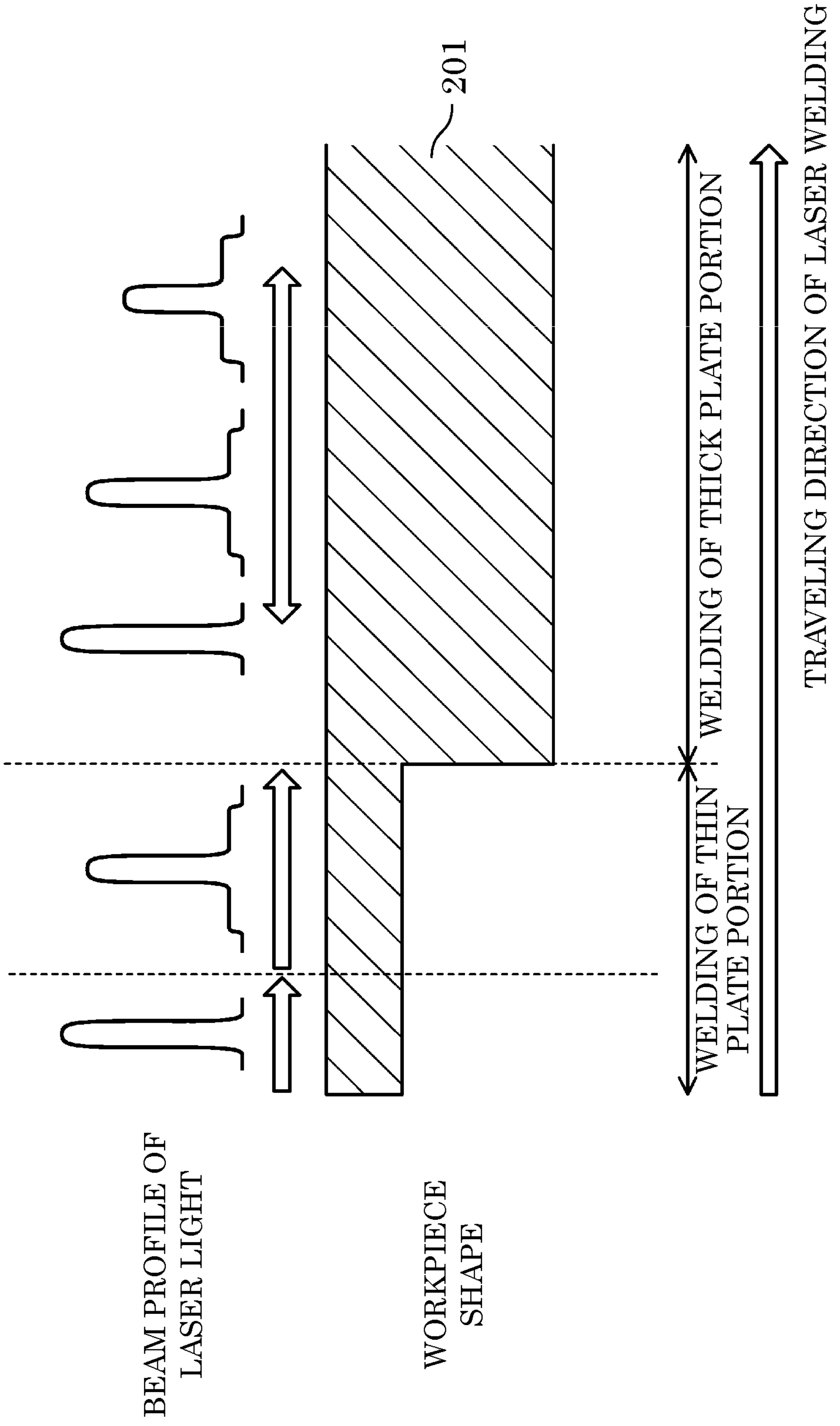
FIG. 18 is a welding sequence of a workpiece according to a third modification example.

FIG. 18 illustrates a welding sequence of a workpiece according to the present modification example, and workpiece 201 has a shape having a thin plate portion and a thick plate portion continuous with the thin plate portion. A thickness of the thick plate portion is more than a thickness of the thin plate portion.

First, when the thin plate portion is laser-welded, workpiece 201 is illuminated by laser light LB in the sequence illustrated in FIG. 16. In the thin plate portion having a thickness equal to or less than a predetermined thickness, weld-penetration depth D may not be deep. Thus, after workpiece 201 is illuminated by laser light LB with a beam profile having a unimodal peak at the start of welding and molten pool 210 and keyholes 220 are formed, the power distribution of laser light LB is changed to be broad, and constricted portion 222 is prevented from being formed in keyholes 220.

Subsequently, when the welding of the thin plate portion is ended and the welding of the thick plate portion is started, workpiece 201 is illuminated by laser light LB in the sequence illustrated in FIG. 17. That is, workpiece 201 is illuminated by laser light LB while the power distribution of laser light LB is periodically changed at the natural vibration frequency.

In this manner, welding defects such as air bubbles 223 inside workpiece 201 and unevenness 211 and spatter 212 on the surface of workpiece 201, which are likely to occur in the thick plate welding, can be prevented as described above while penetration depth D is increased, and the welding quality can be improved.

Depending on the material of workpiece 201 and the thickness of the thin plate portion, the thin plate portion may be welded in a state where laser light LB is fixed such that the power distribution becomes broad from the beginning.

Other Exemplary Embodiments

In the first exemplary embodiment, although first optical member 51 is configured to be movable inside and outside of the optical path of laser light LB, the present invention is not particularly limited thereto, and the first optical member may be fixedly disposed in the optical path of laser light LB. However, in this case, first optical member 51 is also rotatable about the axis of output shaft 71*a*. In this case, second optical member 52 or third optical member 53 is disposed outside of the optical path of laser light LB. Similarly, second optical member 52 and third optical member 53 may be fixed in the optical path of laser light LB. However, in this case, second optical member 52 and third optical member 53 are also rotatable about the axis of output shaft 72*a* and the axis of output shaft 73*a*, respectively. In this case, the remaining two optical members are disposed outside of the optical path of laser light LB.

In the second and third exemplary embodiments including the third modification example, although the multi-clad fiber having the structure illustrated in FIG. 11 has been described as an example, other structures may be used. For example, one or a plurality of claddings may be provided on the outer peripheral side of second cladding 91*c*. In this case, the refractive indexes of the claddings provided outside second cladding 91*c* may be sequentially lowered. The cladding on which laser light LB can be incident may be up to the cladding excluding the outermost cladding. Of course, a film or a resin-based protective layer for mechanically protecting the fiber is provided outside the outermost cladding.

An output and a wavelength of laser light LB can be appropriately changed depending on a material and a shape of the workpiece or processing contents.

In order to tilt first to third optical members 51 to 53, an actuator other than first to third motors 71 to 73, for example, a piezoelectric actuator or the like may be used.

In the present specification, although so-called keyhole type laser welding in which keyhole 220 is formed in molten pool 210 has been described as an example, the type of the laser welding can be appropriately selected depending on the material and shape of the workpiece, required weld-penetration depth D, a width of the weld bead, and the like.

INDUSTRIAL APPLICABILITY

The laser processing device according to the present invention is useful as a laser processing device capable of easily switching between laser light emitting heads from which laser light is emitted and capable of processing a large amount of workpieces.

REFERENCE MARKS IN THE DRAWINGS

10: laser oscillator
20: beam control mechanism
30: condenser lens
41 to 43: first to third optical path changing mechanism
51 to 53: first to third optical members
60*a*, 60*b*, 60*c*: holder
71 to 73: first to third motors
80: controller
90: fiber bundle
91 to 93: first to third optical fibers
91*a*: core
91*b*: first cladding
91*c*: second cladding
121 to 123: first to third laser light emitting heads
131 to 133: first to third manipulators
201 to 203: workpiece
210: molten pool
220: keyhole
221: opening
1000: laser processing device
LB: laser light

The invention claimed is:

1. A laser processing device, comprising at least:
a laser oscillator that generates laser light;
a fiber bundle that is formed by bundling a plurality of optical fibers so as to have a predetermined arrangement relationship;
a beam control mechanism that is provided in the laser oscillator; and
a plurality of laser light emitting heads that are attached to emission ends of the plurality of optical fibers, respectively, and illuminate the laser light to workpieces, respectively, wherein
the beam control mechanism includes at least
a condenser lens that receives the laser light, and condenses the laser light at a predetermined magnification,
a plurality of optical path changing mechanisms that are provided on an optical path of the laser light, the plurality of optical path changing mechanisms being provided between the condenser lens and an incident end face of the fiber bundle, and changing the optical path of the laser light, and
a controller that controls operations of the plurality of optical path changing mechanisms,
wherein the beam control mechanism causes the laser light to be incident on one optical fiber selected from among the plurality of optical fibers, and causes the laser light to be emitted from the laser light emitting head attached to the one optical fiber.

2. The laser processing device according to claim 1, wherein
each of the plurality of optical path changing mechanisms corresponds to each of the plurality of optical fibers,
each of the plurality of optical path changing mechanisms includes
a parallel plate-shaped optical member that transmits the laser light, and is provided to be tiltable about a tilt axis intersecting with an optical axis of the laser light, and
an actuator that is coupled to the optical member,
the controller moves one optical member included in one optical path changing mechanism among the plurality of optical path changing mechanisms to a predetermined position, and drives one actuator included in the one optical path changing mechanism, and causes the laser light to be incident on one optical fiber corresponding to the one optical path changing mechanism by tilting the one optical member coupled to the one actuator about the tilt axis.

3. The laser processing device according to claim 2, wherein a plurality of the optical members are provided to be movable between an outside of the optical path and the predetermined position on the optical path of the laser light traveling between the condenser lens and the incident end face of the fiber bundle.

4. The laser processing device according to claim 2, wherein a plurality of the optical members are, respectively, disposed at a plurality of positions different from each other on the optical path of the laser light traveling between the condenser lens and the incident end face of the fiber bundle, and the predetermined position is one of the plurality of positions.

5. The laser processing device according to claim 1, wherein the beam control mechanism controls a power distribution of the laser light emitted from the laser light emitting head attached to the one optical fiber by changing an incident position of the laser light on an incident end face of the one optical fiber.

6. The laser processing device according to claim 5, wherein the one optical fiber includes at least a core, a first cladding provided coaxially with the core on an outer peripheral side of the core, and a second cladding provided coaxially with the core on an outer peripheral side of the first cladding, and the beam control mechanism causes the laser light to be incident on at least one of the core and the first cladding.

7. The laser processing device according to claim 5, wherein the beam control mechanism controls the power distribution of the laser light emitted from the laser light emitting head attached to the one optical fiber according to at least one of a material of the workpiece and a shape of a portion of the workpiece to be laser-machined.

8. The laser processing device according to claim 7, wherein the beam control mechanism is configured to switch between power distributions of the laser light emitted from the laser light emitting head attached to the one optical fiber during the laser processing of the workpiece.

9. The laser processing device according to claim 8, wherein the beam control mechanism is configured to periodically switch between the power distributions of the laser light emitted from the laser light emitting head attached to the one optical fiber during the laser processing of the workpiece.

10. The laser processing device according to claim 1, wherein the predetermined arrangement relationship includes a first optical fiber of the plurality of optical fibers disposed at a center position and other optical fibers of the plurality of optical fibers arranged radially with respect to the center position, the first optical fiber is encircled by two or more concentric fiber laps, each of the concentric fiber laps comprised of two or more fibers of the plurality of optical fibers, wherein the two or more concentric fiber laps include an upper fiber lap and a lower fiber lap, the lower fiber lap being situated closer to the first optical fiber than the upper fiber lap, and wherein a fiber included in the upper fiber lap is disposed so that the fiber included in the upper fiber lap is positioned on an imaginary line, the imaginary line connecting the center of the first optical fiber and the center of a corresponding fiber included in the lower fiber lap.

11. The laser processing device according to claim 1, wherein the plurality of optical path changing mechanisms control all of the laser light to be incident on the one optical fiber selected from among the plurality of optical fibers.

12. A laser processing method using the laser processing device according to claim 5, the method comprising at least:

a first illumination step of illuminating the laser light having a first power distribution to the workpiece; and a second illumination step of subsequently illuminating the laser light having a second power distribution different from the first power distribution to the workpiece.

13. The laser processing method according to claim 12, wherein in the first illumination step, a molten pool and a keyhole are formed on a surface of the workpiece, and in the second illumination step, an opening of the keyhole is expanded, and the molten pool is grown so as to have a desired weld-penetration depth.

14. The laser processing method according to claim 13, wherein in the second illumination step, the power distributions of the laser light are periodically switched at a predetermined frequency.

15. The laser processing method according to claim 14, wherein the predetermined frequency is substantially equal to a natural vibration frequency of the keyhole formed in the workpiece.

16. The laser processing method according to claim 12, wherein in the first illumination step, a first portion of the workpiece having a first thickness is illuminated by the laser light, and in the second illumination step, a second portion of the workpiece having a second thickness different from the first thickness is illuminated by the laser light.

* * * * *